(12) United States Patent
Dua et al.

(10) Patent No.: US 9,678,194 B2
(45) Date of Patent: *Jun. 13, 2017

(54) POSITIONING USING OBSERVER-BASED TIME-OF-ARRIVAL MEASUREMENTS

(71) Applicant: QUALCOMM Incorporated, San Diego, CA (US)

(72) Inventors: Praveen Dua, Cupertino, CA (US); Lionel Jacques Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,212

(22) Filed: Apr. 16, 2015

(65) Prior Publication Data

US 2015/0219749 A1 Aug. 6, 2015

Related U.S. Application Data

(63) Continuation-in-part of application No. 13/797,621, filed on Mar. 12, 2013, now Pat. No. 9,066,202.
(Continued)

(51) Int. Cl.
*H04W 24/00* (2009.01)
*G01S 5/10* (2006.01)
(Continued)

(52) U.S. Cl.
CPC .............. *G01S 5/10* (2013.01); *G01S 13/878* (2013.01); *H04W 4/023* (2013.01); *H04W 64/00* (2013.01)

(58) Field of Classification Search
CPC ........ G01S 13/767; G01S 13/878; G01S 5/10; H04W 64/00; H04W 4/023; F21V 11/02; F21V 19/00; Y10T 29/49826
(Continued)

(56) References Cited

U.S. PATENT DOCUMENTS

| 5,144,312 A | 9/1992 | McCann |
| 5,485,163 A | 1/1996 | Singer et al. |

(Continued)

FOREIGN PATENT DOCUMENTS

| CN | 1199315 A | 11/1998 |
| CN | 101772132 A | 7/2010 |

(Continued)

OTHER PUBLICATIONS

International Preliminary Report on Patentability—PCT/US2013/051437—The International Bureau of WIPO Geneva, Switzerland, Mar. 23, 2015, 9 pgs.
(Continued)

*Primary Examiner* — Timothy Pham
(74) *Attorney, Agent, or Firm* — Hunter Clark PLLC

(57) ABSTRACT

Disclosed are implementations that include a method, performed by a network control device, including sending a first instruction to a first device to send a first measurement signal, and sending a second instruction to a second device to receive the first measurement signal. Following receipt of a first acknowledgement signal from the target mobile device, the first and second devices change their roles so the second device sends, and the first device receives, a second measurement signal, and the first and second devices receive a second acknowledgement signal from the target device. Position of the target device is determined based on timing measurements associated with the first and second measurement signals, the first and second acknowledgement signals, and on known positions of the first and second devices. Another network device is selected to perform additional measurements upon a determination that a desired accuracy of the position determined was not achieved.

30 Claims, 14 Drawing Sheets

Related U.S. Application Data

(60) Provisional application No. 61/683,182, filed on Aug. 14, 2012.

(51) Int. Cl.
*H04W 4/02* (2009.01)
*G01S 13/87* (2006.01)
*H04W 64/00* (2009.01)

(58) Field of Classification Search
USPC ..................................................... 455/456.2
See application file for complete search history.

(56) References Cited

U.S. PATENT DOCUMENTS

| | | | |
|---|---|---|---|
| 6,031,490 | A | 2/2000 | Forssen et al. |
| 6,034,635 | A | 3/2000 | Gilhousen |
| 6,078,826 | A | 6/2000 | Croft et al. |
| 6,101,391 | A | 8/2000 | Ishizuka et al. |
| 6,201,803 | B1 | 3/2001 | Munday et al. |
| 6,246,884 | B1 | 6/2001 | Karmi et al. |
| 6,300,904 | B1 | 10/2001 | Dvorak et al. |
| 6,314,299 | B1 | 11/2001 | Schreib et al. |
| 6,519,464 | B1 | 2/2003 | Santhoff et al. |
| 6,760,591 | B1 | 7/2004 | Klinger |
| 6,861,982 | B2 | 3/2005 | Forstrom et al. |
| 8,233,457 | B1 | 7/2012 | Chen et al. |
| 8,244,275 | B2 | 8/2012 | Islam |
| 8,259,692 | B2 | 9/2012 | Bajko |
| 2003/0128161 | A1 | 7/2003 | Oh et al. |
| 2003/0135324 | A1 | 7/2003 | Navab |
| 2004/0078151 | A1 | 4/2004 | Aljadeff et al. |
| 2004/0102198 | A1* | 5/2004 | Diener ............... H04W 24/00 455/456.1 |
| 2004/0162084 | A1 | 8/2004 | Wang |
| 2005/0003828 | A1 | 1/2005 | Sugar et al. |
| 2005/0143092 | A1 | 6/2005 | Tamaki et al. |
| 2005/0255864 | A1 | 11/2005 | Kent et al. |
| 2006/0049976 | A1 | 3/2006 | McFarland |
| 2006/0071780 | A1 | 4/2006 | McFarland |
| 2006/0163349 | A1 | 7/2006 | Neugebauer |
| 2007/0162185 | A1 | 7/2007 | McFarland |
| 2008/0026770 | A1 | 1/2008 | Rudravaram et al. |
| 2008/0051103 | A1 | 2/2008 | Goren et al. |
| 2008/0081172 | A1 | 4/2008 | Strock |
| 2008/0153509 | A1 | 6/2008 | Piekarski |
| 2008/0181172 | A1 | 7/2008 | Angelhag et al. |
| 2008/0182593 | A1 | 7/2008 | Sharony et al. |
| 2009/0005083 | A1 | 1/2009 | Hoshino et al. |
| 2009/0073031 | A1 | 3/2009 | Kim |
| 2009/0219145 | A1 | 9/2009 | Wong et al. |
| 2010/0081451 | A1 | 4/2010 | Mueck et al. |
| 2010/0128617 | A1 | 5/2010 | Aggarwal et al. |
| 2010/0177681 | A1 | 7/2010 | Sahinoglu |
| 2010/0225541 | A1 | 9/2010 | Hertzog et al. |
| 2010/0278060 | A1 | 11/2010 | Lee et al. |
| 2011/0051640 | A1 | 3/2011 | Ramesh et al. |
| 2011/0183683 | A1 | 7/2011 | Das et al. |
| 2011/0218759 | A1 | 9/2011 | Jin |
| 2011/0269478 | A1 | 11/2011 | Das et al. |
| 2012/0021759 | A1 | 1/2012 | Chen et al. |
| 2012/0032855 | A1 | 2/2012 | Reede et al. |
| 2012/0294231 | A1 | 11/2012 | Finlow-Bates et al. |
| 2012/0315919 | A1* | 12/2012 | Hirsch ............... G01S 13/767 455/456.1 |
| 2013/0211780 | A1 | 8/2013 | Meador et al. |
| 2014/0051460 | A1 | 2/2014 | Dua et al. |

FOREIGN PATENT DOCUMENTS

| | | |
|---|---|---|
| CN | 102118409 A | 7/2011 |
| JP | H10257545 A | 9/1998 |
| JP | 2008039738 A | 2/2008 |
| JP | 2012088125 A | 5/2012 |
| WO | 02067006 A2 | 8/2002 |
| WO | 03088626 A2 | 10/2003 |
| WO | 2011113176 A1 | 9/2011 |

OTHER PUBLICATIONS

International Search Report and Written Opinion—PCT/US2013/051437—ISA/EPO—Oct. 24, 2013, 12 pgs.
Written Opinion of the International Preliminary Examining Authority—PCT/US2013/051437—IPEA/EPO—Oct. 29, 2014, 7 pgs.
International Search Report and Written Opinion—PCT/US2013/025231—ISA/EPO —Apr. 26, 2013—12 pgs.

* cited by examiner

POSITIONING USING OBSERVER-BASED TIME-OF-ARRIVAL MEASUREMENTS

CROSS-REFERENCE TO RELATED APPLICATIONS

This application is a continuation-in-part of, and claims priority to, U.S. application Ser. No. 13/797,621, entitled "POSITIONING USING OBSERVER-BASED TIME-OF-ARRIVAL MEASUREMENTS," and filed Mar. 12, 2013, which claims priority to and benefit of U.S. Provisional Application No. 61/683,182, filed Aug. 14, 2012, and entitled "SYSTEM RECIPE FOR OBSERVER BASED TOA MEASUREMENTS," each of which is assigned to the Assignee hereof, and expressly incorporated herein by reference in their entirety and for all purposes.

BACKGROUND

It is often desired to know or determine the location of a device in a network such as a wireless local area network (WLAN). Various techniques for determining location in a WLAN presently exist. For example, a communication may be sent from a first device to a second device that then sends an acknowledgement message back to the first device. The round-trip time (RTT) from the sending of the communication to the receipt of the acknowledgement may be used to determine the distance (which may be an estimated distance) from the second device to the first device, from which location information for the second device may be determined. The RTT, however, includes turnaround time used by the second device to process the communication and send the acknowledgement. If this turnaround time varies, then the determined distance from the second device to the first device will vary.

Referring to FIGS. 1A-1B, a system for determining RTT includes an access point and a mobile device. At a first time, the access point sends Packet 1 to the mobile device that responds by sending an acknowledgement signal ACK 1 to the access point. At a second time, Packet 2 is sent to the mobile device that returns an acknowledgement signal ACK 2 to the access point. An RTT from a time that a packet is sent from a media access control (MAC) of the access point to a time that the acknowledgement reaches the MAC can be determined according to:

$$RX'=RX+MP+CSD \qquad (1)$$

In equation (1), RX is the ideal receive delay, of the acknowledgement, incurred from the antenna of the access point to the MAC of the access point if a cabled signal were presented at the antenna free of multipath and cyclic shift delay (CSD), MP is a timing error attributable to multipath in the receive path, and CSD is the timing error in receiving the acknowledgement by the access point attributable to the cyclic shift delay present at the transmitter of the acknowledgement. RX' represents the sum of actual delay and timing errors incurred in the scenario of over-the-air reception of the packet in the presence of real multipath and CSD error terms.

SUMMARY

An example method of determining a position of a target device includes: sending a first measurement signal from a first known-position device; receiving the first measurement signal at a second known-position device; receiving a first acknowledgement signal from the target device at the first known-position device and at the second known-position device; determining the position of the target device using first timing information associated with the first measurement signal and the first acknowledgement signal, a first position of the first known-position device, and a second position of the second known-position device.

Implementations of such a method may include one or more of the following features. The first timing information comprises a transmission time of the first measurement signal, a first time of arrival of the first acknowledgement signal in the first known-position device, a second time of arrival of the first measurement signal in the second known-position device, and a third time of arrival of the first acknowledgement signal in the second known-position device, and using the first timing information comprises determining a first distance and a second distance from the target device to the first known-position device and the second known-position device, respectively, using the transmission time, the first time of arrival, the second time of arrival, and the third time of arrival. Using the transmission time, the first time of arrival, the second time of arrival, and the third time of arrival comprises determining a difference between (1) a difference between the first time of arrival and the transmission time and (2) a difference between the third time of arrival and the second time of arrival. The method further includes: receiving the first measurement signal at a third known-position device; and receiving the first acknowledgement signal from the target device at the third known-position device; where the first timing information comprises a transmission time of the first measurement signal, a first time of arrival of the first acknowledgement signal in the first known-position device, a fourth time of arrival of the first measurement signal in the third known-position device, and a fifth time of arrival of the first acknowledgement signal in the third known-position device; and using the first timing information comprises determining a third distance from the target device to the third known-position device using the fourth time of arrival and the fifth time of arrival.

Also or alternatively, implementations of such a method may include one or more of the following features. The method further includes: sending a second measurement signal from the second known-position device; receiving the second measurement signal at the first known-position device; and receiving a second acknowledgement signal from the target device at the first known-position device and at the second known-position device; where determining the position of the target device further comprises using second timing information associated with the second measurement signal and the second acknowledgement signal. The method further includes sending an exchange message from the first known-position device indicating receipt of the first acknowledgement signal, where the second measurement signal is sent from the second known-position device in response to the exchange message being received by the second known-position device. The first known-position device and the second known-position device form a measurement-observer known-position device pair, and the method further includes obtaining further timing information from further measurement-observer known-position device pairs for the target device, where determining the position of the target device further comprises using the further timing information to determine the position of the target device using trilateration.

An example apparatus for determining a position of a target device includes: a network interface; a control engine communicatively coupled to the network interface and configured to: send, via the network interface, a first instruction to a first network device to act as a measurement network device to send a first measurement signal; and send, via the network interface, a second instruction to a second network device to act as an observer network device to receive the first measurement signal, the first network device having a first known position and the second network device having a second known position; and a position engine, communicatively coupled to the control engine and the network interface, configured to: receive, via the network interface, first timing information associated with the first measurement signal; and determine a position of the target device based on the first timing information, the first known position, and the second known position.

Implementations of such an apparatus method may include one or more of the following features. The first timing information comprises: a transmission time of the first measurement signal; a first time of arrival in the first network device of a first acknowledgement signal sent by the target device in response to receiving the first measurement signal; a second time of arrival of the first measurement signal in the second network device; and a third time of arrival of the first acknowledgement signal in the second network device, and the position engine, to determine the position of the target device, is configured to determine a first distance and a second distance from the target device to the first network device and the second network device, respectively, using the transmission time, the first time of arrival, the second time of arrival, and the third time of arrival. Using the transmission time, the first time of arrival, the second time of arrival, and the third time of arrival comprises determining a difference between (1) a difference between the first time of arrival and the transmission time and (2) a difference between the third time of arrival and the second time of arrival. The control engine is further configured to instruct a third network device to act as another observer network device, the third network device having a third known position, the first timing information further comprises: a fourth time of arrival of the first measurement signal in the third network device; and a fifth time of arrival of the first acknowledgement signal in the third network device, and the position engine, to determine the position of the target device, is further configured to determine a third distance from the target device to the third network device using the fourth time of arrival and the fifth time of arrival. The control engine is further configured to instruct the first network device to act as the observer network device and the second network device to act as the measurement network device, and the position engine is further configured to: receive, via the network interface, second timing information associated with a second measurement signal sent from the second network device and received by the first network device while acting as the observer network device; and determine the position of the target device further based on the second timing information.

Another example apparatus for determining a position of a target device includes: a network interface; control means, communicatively coupled to the network interface, for: sending, via the network interface, a first instruction to a first network device to act as a measurement network device to send a first measurement signal; and sending, via the network interface, a second instruction to a second network device to act as an observer network device to receive the first measurement signal, the first network device having a first known position and the second network device having a second known position; and position determining means, communicatively coupled to the control means and the network interface, for: receiving, via the network interface, first timing information associated with the first measurement signal; and determining a position of the target device based on the first timing information, the first known position, and the second known position.

Implementations of such an apparatus may include one or more of the following features. The first timing information comprises: a transmission time of the first measurement signal; a first time of arrival in the first network device of a first acknowledgement signal sent by the target device in response to receiving the first measurement signal; a second time of arrival of the first measurement signal in the second network device; and a third time of arrival of the first acknowledgement signal in the second network device, and the position determining means, for determining the position of the target device, is configured to determine a first distance and a second distance from the target device to the first network device and the second network device, respectively, using the transmission time, the first time of arrival, the second time of arrival, and the third time of arrival. Using the transmission time, the first time of arrival, the second time of arrival, and the third time of arrival comprises determining a difference between (1) a difference between the first time of arrival and the transmission time and (2) a difference between the third time of arrival and the second time of arrival. The control means is further for instructing a third network device to act as another observer network device, the third network device having a third known position, the first timing information further comprises: a fourth time of arrival of the first measurement signal in the third network device; and a fifth time of arrival of the first acknowledgement signal in the third network device, and the position determining means, for determining the position of the target device, is further configured to determine a third distance from the target device to the third network device using the fourth time of arrival and the fifth time of arrival. The control means is further configured to instruct the first network device to act as the observer network device and the second network device to act as the measurement network device, and the position determining means is further for: receiving, via the network interface, second timing information associated with a second measurement signal sent from the second network device and received by the first network device while acting as the observer network device; and determining the position of the target device further based on the second timing information.

An example processor-readable storage medium includes processor-readable instructions configured to cause a processor to: send a first instruction to a first network device to act as a measurement network device to send a first measurement signal; send a second instruction to a second network device to act as an observer network device to receive the first measurement signal, the first network device having a first known position and the second network device having a second known position; receive first timing information associated with the first measurement signal; and determine a position of the target device based on first timing information, the first known position, and the second known position; where the first timing information is associated with the first measurement signal.

Implementations of such a storage medium may include one or more of the following features. The first timing information comprises: a transmission time of the first measurement signal; a first time of arrival in the first network device of a first acknowledgement signal sent by the target device in response to receiving the first measurement signal; a second time of arrival of the first measurement signal in the second network device; and a third time of arrival of the first acknowledgement signal in the second network device, and the instructions configured to cause the processor to determine the position of the target device are configured to cause the processor to determine a first distance and a second distance from the target device to the first network device and the second network device, respectively, using the transmission time, the first time of arrival, the second time of arrival, and the third time of arrival. Using the transmission time, the first time of arrival, the second time of arrival, and the third time of arrival comprises determining a difference between (1) a difference between the first time of arrival and the transmission time and (2) a difference between the third time of arrival and the second time of arrival. The instructions further comprise instructions configured to cause the processor to instruct a third network device to act as another observer network device, the third network device having a third known position, the first timing information further comprises: a fourth time of arrival of the first measurement signal in the third network device; and a fifth time of arrival of the first acknowledgement signal in the third network device, and the instructions configured to cause the processor to determine the position of the target device are configured to cause the processor to determine a third distance from the target device to the third network device using the fourth time of arrival and the fifth time of arrival. The processor-readable storage medium further includes instructions configured to cause the processor to instruct the first network device to act as the observer network device and the second network device to act as the measurement network device, where the instructions configured to cause the processor to determine the position of the target device are configured to cause the processor to: receive, via the network interface, second timing information associated with a second measurement signal sent from the second network device and received by the first network device while acting as the observer network device; and determine the position of the target device further based on the second timing information.

Another example method of determining a position of a target device includes: sending a first instruction to a first network device to act as a measurement network device to send a first measurement signal; sending a second instruction to a second network device to act as an observer network device to receive the first measurement signal, the first network device having a first known position and the second network device having a second known position; receiving first timing information associated with the first measurement signal; and determining the position of the target device based on the first timing information, the first known position, and the second known position.

Implementations of such a method may include one or more of the following features. The first timing information comprises: a transmission time of the first measurement signal; a first time of arrival in the first network device of a first acknowledgement signal sent by the target device in response to receiving the first measurement signal; a second time of arrival of the first measurement signal in the second network device; and a third time of arrival of the first acknowledgement signal in the second network device, and determining the position of the target device comprises determining a first distance and a second distance from the target device to the first network device and the second network device, respectively, using the transmission time, the first time of arrival, the second time of arrival, and the third time of arrival. Using the transmission time, the first time of arrival, the second time of arrival, and the third time of arrival comprises determining a difference between (1) a difference between the first time of arrival and the transmission time and (2) a difference between the third time of arrival and the second time of arrival. The method further includes instructing a third network device to act as another observer network device, the third network device having a third known position, where the first timing information further comprises: a fourth time of arrival of the first measurement signal in the third network device; and a fifth time of arrival of a first acknowledgement signal in the third network device, and where determining the position of the target device comprises determining a third distance from the target device to the third network device using the fourth time of arrival and the fifth time of arrival. The method further includes: instructing the first network device to act as the observer network device and the second network device to act as the measurement network device; and receiving second timing information associated with a second measurement signal sent from the second network device and received by the first network device while acting as the observer network device, where determining the position of the target device is further based on the second timing information.

In some variations, an additional method, to determine a position of a target mobile device, e.g., at a processor-based network control device, is disclosed. The additional method includes sending, by the network control device, a first instruction to a first network device, selected from a plurality of known-position network devices, to act as a measurement network device to send a first measurement signal, and sending, by the network control device, a second instruction to a second network device, selected from the plurality of known-position network devices, to act as an observer network device to receive the first measurement signal, with the first network device associated with a first known position and the second network device associated with a second known position. Following receipt of a first acknowledgement signal from the target mobile device, with the first acknowledgement signal being sent in response to receipt of the first measurement signal by the target mobile device, the first network device and the second network device change their roles so that the second network device sends a second measurement signal received by the first network device, and the first network device and the second network device receive a second acknowledgement signal sent from the target mobile device in response to receipt of the second measurement signal by the target mobile device. The position of the target mobile device is determined based on timing measurements associated with the first measurement signal, the second measurement signal, the first acknowledgement signal, and the second acknowledgement signal, and based on the first known position and the second known position. The additional method also includes selecting, by the network control device, at least one other network device from the plurality of known-position network devices to perform additional measurements with another of the plurality of known-position network devices in response to a determination that a desired accuracy of the determined position of the target mobile device was not achieved.

Embodiments of the additional method may include at least some of the features described in the present disclosure, including at least some of the features described above in relation to the methods, the devices, the apparatus, and the processor-readable storage media, as well as one or more of the following features.

The additional method may further include sending, by the network control device, a third instruction to cause the first network device and the second network device to change their roles.

The first network device and the second network device may be configured to change their roles in response to a measurement-complete indication or an exchange message communicated by the first network device following receipt of the first acknowledgement signal, by the first network device, from the target mobile device and completion of a measurement of the first acknowledgement signal by the first network device.

The network control device may include a network-based positioning (NBP) library module configured to select the first network device, the second network device, and the at least one other network device from the plurality of known-position network devices, and to cause the first instruction and the second instruction to be sent.

The network control device may be implemented at the target mobile device.

The network control device may be implemented at a remote server, different from the target mobile device, in communication with the plurality of known-position network devices. The remote server may include a network interface to communicate with the plurality of known-position network devices, and a position engine to determine the position of the target mobile device.

The additional method may further include receiving from the target mobile device a request message to cause the sending of at least the first instruction and the second instruction from the network control device.

The additional method may further include determining, at the network control device, the position of the target mobile device based on the timing measurements associated with the first measurement signal, the second measurement signal, the first acknowledgement signal, the second acknowledgement signal, and based on the first known position and the second known position.

The timing measurements may include a transmission time of the first measurement signal, a first time of arrival of the first acknowledgement signal at the first network device, a second time of arrival of the first measurement signal at the second network device, and a third time of arrival of the first acknowledgement signal at the second network device. The position of the target mobile device may be determined based on a first distance and a second distance from the target mobile device to the first network device and the second network device, respectively, determined based, at least in part, on the transmission time of the first measurement signal, the first time of arrival, the second time of arrival, and the third time of arrival.

The timing measurements may further include a second transmission time of the second measurement signal, a fourth time of arrival of the second acknowledgement signal at the second network device, a fifth time of arrival of the second measurement signal at the first network device, and a sixth time of arrival of the second acknowledgement signal at the first network device. The position of the target mobile device may be determined based on the first distance and the second distance from the target mobile device to the first network device and the second network device, respectively, with the first and second distances further determined based on the second transmission time, the fourth time of arrival, the fifth time of arrival, and the sixth time of arrival.

The first distance and the second distance determined based on the transmission time of the first measurement signal, the first time of arrival, the second time of arrival, and the third time of arrival may be determined based on a difference between (1) a first difference between the first time of arrival and the transmission time of the first measurement signal and (2) a second difference between the third time of arrival and the second time of arrival.

The additional method may further include sending, by the network control device, a fourth instruction to a third network device to receive the first measurement signal at the third network device, and sending, by the network control device, a fifth instruction to the third network device to receive the first acknowledgement signal from the target mobile device at the third network device. The timing measurements may include a transmission time of the first measurement signal, the first time of arrival of the first acknowledgement signal at the first network device, a seventh time of arrival of the first measurement signal at the third network device, and an eighth time of arrival of the first acknowledgement signal at the third network device. The position of the target mobile device may be determined based further on a third distance from the target mobile device to the third network device determined using the seventh time of arrival and the eighth time of arrival.

The method may further include sending, by the network control device, a sixth instruction to the first network device to send an exchange message from the first network device indicating receipt of the first acknowledgement signal. The second measurement signal may be sent from the second network device in response to the exchange message being received by the second network device.

The position of the target mobile device may be determined based further on further timing measurements from the at least one other of the plurality of known-position network devices and the other of the plurality of known-position network devices.

In some variations, a network control device is provided. The network control device includes a communication module, memory, and one or more processors coupled to the memory and to the communication module. The network control device is configured to send a first instruction to a first network device, selected from a plurality of known-position network devices, to act as a measurement network device to send a first measurement signal, and send a second instruction to a second network device, selected from the plurality of known-position network devices, to act as an observer network device to receive the first measurement signal, with the first network device being associated with a first known position and the second network device being associated with a second known position. Following receipt of a first acknowledgement signal from the target mobile device, the first network device and the second network device change their roles so that the second network device sends a second measurement signal received by the first network device, and the first network device and the second network device receive a second acknowledgement signal sent from the target mobile device in response to receipt of the second measurement signal by the target mobile device, with the first acknowledgement signal being sent in response to receipt of the first measurement signal by the target mobile device. The position of the target mobile device is determined based on timing measurements associated with the first measurement signal, the second measurement signal, the first acknowledgement signal, and the second acknowledgement signal, and based on the first known position and the second known position. The network control device is further configured to select at least one other network device from the plurality of known-position network devices to perform additional measurements with another of the plurality of known-position network devices in response to a determination that a desired accuracy of the determined position of the target mobile device was not achieved.

Embodiments of the network control device may include at least some of the features described in the present disclosure, including at least some of the features described above in relation to the methods, the devices, the apparatus, and the processor-readable storage media, as well as one or more of the following features.

The network control device may further be configured to send a third instruction to cause the first network device and the second network device to change their roles.

The network control device may further include a network-based positioning (NBP) library module configured to select the first network device, the second network device, and the at least one other network device from the plurality of known-position network devices, and to cause the first instruction and the second instruction to be sent.

The network control device may further include a position engine (PE) configured to determine the position of the target mobile device based, at least in part, on the timing measurements associated with the first measurement signal, the second measurement signal, the first acknowledgement signal, the second acknowledgement signal, and based on the first known position and the second known position.

In some variations, a non-transitory computer readable storage media is provided. The computer readable storage media is programmed with a set of instructions, executable on a processor, to send, by a network control device, a first instruction to a first network device, selected from a plurality of known-position network devices, to act as a measurement network device to send a first measurement signal, and send, by the network control device, a second instruction to a second network device, selected from the plurality of known-position network devices, to act as an observer network device to receive the first measurement signal, with the first network device associated with a first known position and the second network device associated with a second known position. Following receipt of a first acknowledgement signal from the target mobile device, the first network device and the second network device change their roles so that the second network device sends a second measurement signal received by the first network device, and the first network device and the second network device receive a second acknowledgement signal sent from the target mobile device in response to receipt of the second measurement signal by the target mobile device, with the first acknowledgement signal being sent in response to receipt of the first measurement signal by the target mobile device. The position of the target mobile device is determined based on timing measurements associated with the first measurement signal, the second measurement signal, the first acknowledgement signal, and the second acknowledgement signal, and based on the first known position and the second known position. The set of instructions includes further instructions to select, by the network control device, at least one other network device from the plurality of known-position network devices to perform additional measurements with another of the plurality of known-position network devices in response to a determination that a desired accuracy of the determined position of the target mobile device was not achieved.

Embodiments of the computer readable storage media may include at least some of the features described in the present disclosure, including at least some of the features described above in relation to the methods, the devices, the apparatus, and the processor-readable storage media, as well as one or more of the following features.

The set of instructions may further include instructions to send a third instruction to cause the first network device and the second network device to change their roles.

The set of instructions may further include instructions to determine, at the network control device, the position of the target mobile device based on the timing measurements associated with the first measurement signal, the second measurement signal, the first acknowledgement signal, the second acknowledgement signal, and based on the first known position and the second known position.

In some variations, another method to determine a position of a target mobile device, is provided. The other method includes sending, by the target mobile device, a first instruction to a first network device selected from a plurality of known-position network devices to act as a measurement network device to send a first measurement signal, and sending, by the target mobile device, a second instruction to a second network device selected from the plurality of known-position network devices to act as an observer network device to receive the first measurement signal, with the first network device associated with a first known position and the second network device associated with a second known position. The position of the target mobile device is determined based on timing measurements associated with the first measurement signal and a first acknowledgement signal sent by the target mobile device in response to receiving the first measurement signal, and further based on the first known position and the second known position.

Embodiments of the other method may include at least some of the features described in the present disclosure, including at least some of the features described above in relation to the methods, the devices, the apparatus, and the processor-readable storage media, as well as one or more of the following features.

The target mobile device may include a network-based positioning library module configured to select the first network device and the second network device, and to cause the first instruction and the second instruction to be sent.

Items and/or techniques discussed herein may provide one or more of the following capabilities, as well as other capabilities not mentioned. Power consumption for location determination may be reduced, e.g., by reducing the amounts of packets exchanged, compared to present location techniques. System capacity for communication systems that implement device (e.g., mobile device) location determination may be increased, e.g., by reducing the amounts of packets exchanged, compared to present systems. Reliable location determination may be provided for devices that use software media access controllers. Error in device location determination may be reduced by having a tightly constrained fit (e.g., a three-point fit based on a three distance measurements) for a difference between transmission times of signals between a device with an unknown location/position and devices (e.g., access points) with known locations/positions. Location determination error due to variable turnaround time may be reduced or even eliminated. Error in device location determination may be reduced by eliminating dependence on knowledge of device processing times (e.g., turnaround time and signal receiving transfer time from antenna to MAC). Error in device location determination due to cyclic shift delay (CSD) and multipath for signals received at a measuring device may be reduced. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTIONS OF THE DRAWINGS

DETAILED DESCRIPTION

Using techniques discussed herein, an observer network device can be used in combination with a measurement network device to determine location of another network device. For example, a measurement signal is sent from a measurement access point to an observer access point and to a mobile device. The mobile device responds to the measurement signal by sending an acknowledgement signal to the measurement access point and to the observer access point. Times-of-arrival of the measurement signal at the observer access point and the acknowledgement signal at the measurement access point and the observer access point, and a time of transmission of the measurement signal are used to determine a position of the mobile device. The measurement and observer access points can change roles and take further measurements. Further, multiple access point measurement-observer pairs may be used to obtain measurements for use in determining the position of the mobile device. Other implementations may be used. For example, while the example discussed above, and the examples discussed below focus on mobile devices and access points, devices other than mobile devices and/or access points may be used and the techniques discussed herein are applicable to any types of devices having the functionality discussed. Further, a measurement signal may be received and processed by multiple observer devices concurrently and a position of a position of a device of unknown position may be determined using information from the multiple observer devices, perhaps without further measurements.

Figures 1A, 1B:
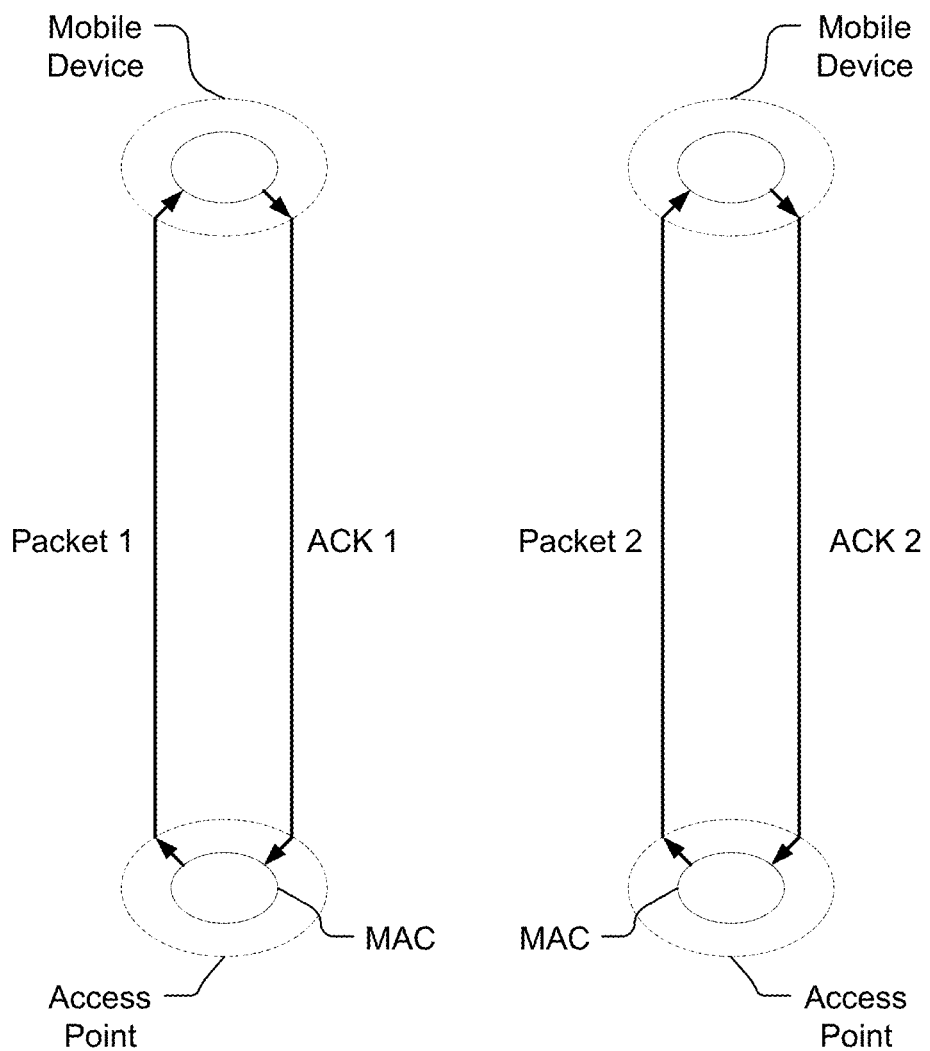
FIGS. 1A-1B are block diagrams of prior art round-trip time measurements.
Figure 2:
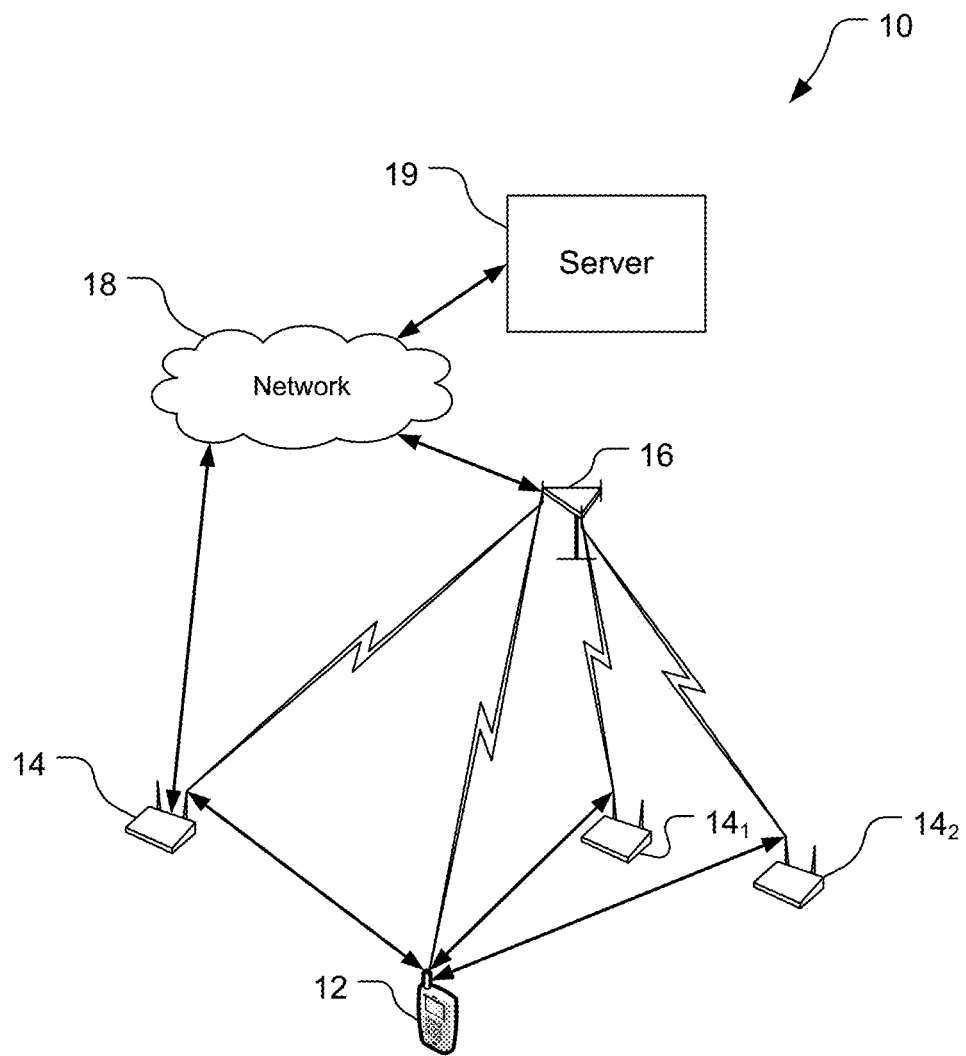
FIG. 2 is a schematic diagram of a communication system.

Referring to FIG. 2, a communication system 10 includes various network devices, a network 18, and a server 19. As an example, in FIG. 2 one network device is shown as a mobile station (MS) 12, other network devices are shown as access points (APs) 14, and still another network device is shown as a base transceiver station (BTS) 16. While APs are typically associated with wireless local area networks (WLANs) and BTSs are typically associated with wireless wide area network (WWANs), the terms AP and BTS are used herein generically as being applicable to WLANs or WWANs as the network devices 14, 16 could be configured for operation in either or both types of networks, and are shown in FIG. 2 as APs and a BTS as an example only. The system 10 is a communication system in that the system 10 can at least send and receive communications between the BTS 16 and the APs 14, between the BTS 16 and the MS 12, between the APs 14 and the MS 12, between the BTS 16 and the network 18, between the APs 14 and the network 18, and between the network 18 and the server 19. Only one MS 12 is shown, but more than one MS 12 will typically be present and the system 10 is configured to support numerous MSs 12 concurrently.

The BTS 16 can wirelessly communicate with the APs 14 via antennas. The BTS 16 may also be referred to as a base transceiver station, an access node (AN), a Node B, an evolved Node B (eNB), etc.

The MS 12 can be moved to various locations, including into buildings and onto different floors of the buildings. The MS 12 may be referred to as an access terminal (AT), a mobile device, user equipment (UE), or a subscriber unit. The MS 12 is shown here as a cellular phone. Other examples of MSs include wireless routers, personal digital assistants (PDAs), netbooks, notebook computers, tablet computers, etc. Only one MS 12 is shown in FIG. 2, and to simplify the discussion below only this MS 12 is discussed.

The APs 14 can be moved to various locations. Pairs of the APs 14, e.g., the AP $14_1$ and the AP $14_2$ are used to measure time of arrival (TOA), with one of the APs 14, e.g., the AP $14_1$, being an observer AP and the other AP 14, e.g., the AP $14_2$, being a measurement AP as discussed below.

Figure 3:
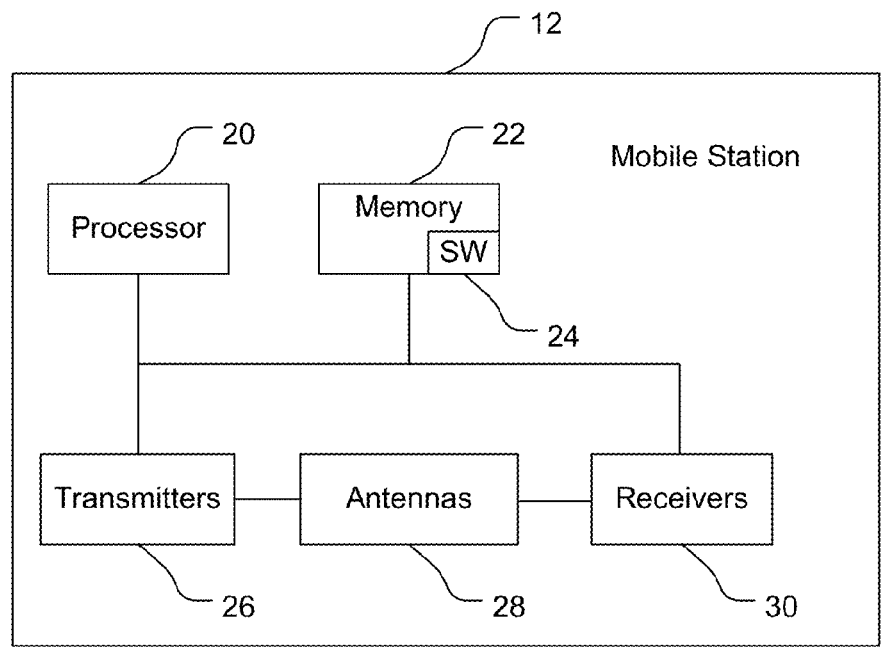
FIG. 3 is a block diagram of a mobile station shown in FIG. 2.

Referring to FIG. 3, an example of the MS 12 comprises a computer system including a processor 20, memory 22 including software 24, transmitters 26, antennas 28, and receivers 30. The transmitters 26, antennas 28, and receivers 30 form a wireless communication module that can communicate with the APs 14. The transmitters 26 and receivers 30 are configured to communicate bi-directionally with the APs 14 via the antennas 28. The processor 20 is preferably an intelligent hardware device, e.g., a central processing unit (CPU) such as those made by ARM®, Intel® Corporation, or AMD®, a microcontroller, an application specific integrated circuit (ASIC), etc. The processor 20 could comprise multiple separate physical entities that can be distributed in the MS 12. The memory 22 is a processor-readable storage medium that includes random access memory (RAM) and read-only memory (ROM). The memory 22 stores the software 24 which is processor-readable, processor-executable software code containing processor-readable instructions that are configured to, when executed, cause the processor 20 to perform various functions described herein. Alternatively, the software 24 may not be directly executable by the processor 20 but configured to cause the processor 20, e.g., when compiled and executed, to perform the functions.

The MS 12 may be configured with any of a variety of media access control (MAC) types. For example, the MS 12 may have a hardware MAC, a firmware assisted MAC, or a software MAC. Hardware MACs typically provide consistent turnaround times (to receive a packet and send an acknowledgement) of about 1-2 clock cycle. Firmware assisted MACs typically provide slightly variable turnaround times of about 10-20 clock cycles. Software MACs typically provide highly variable turnaround times of over 20 clock cycles. The techniques discussed below may be used with the MS 12 having any such MAC. MAC, as used herein, refers to MAC-layer signal processing.

Figure 4:
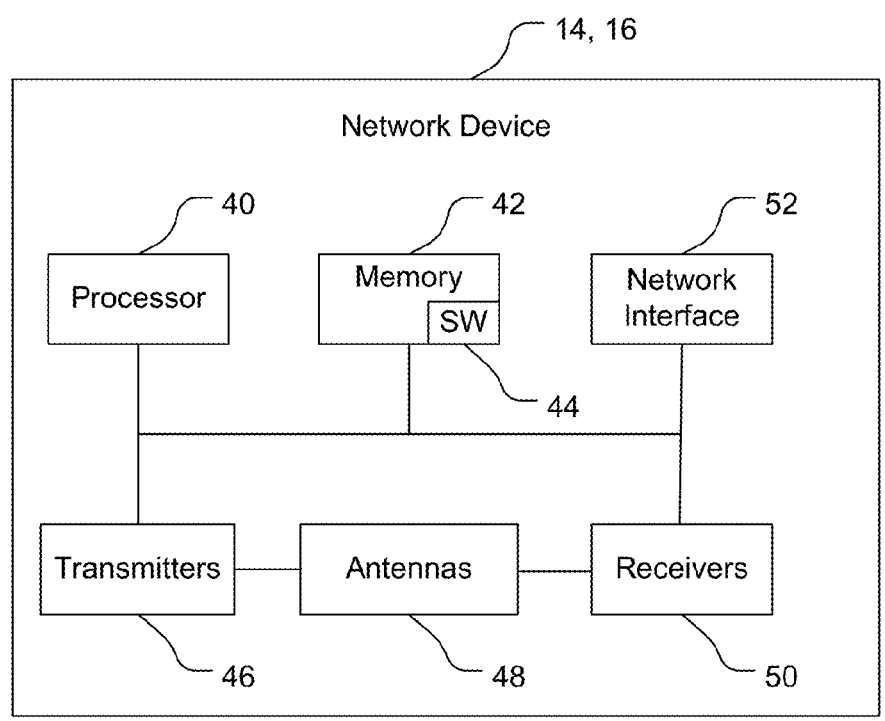
FIG. 4 is a block diagram of a network device shown in FIG. 2.

Referring to FIG. 4, an example of one of the network devices 14, 16 comprises a computer system including a processor 40, memory 42 including software 44, transmitter(s) 46, antenna(s) 48, receiver(s) 50, and a network interface 52. The transmitters 46, antennas 48, and receivers 50 form a wireless communication module that can communicate with the MS 12 and mobile devices (e.g., mobile phones, tablet computers, personal digital assistants, etc.) and/or another entity. The transmitters 46 and receivers 50 are configured to communicate bi-directionally with the MS 12 and one or more mobile devices via the antennas 28. The transmitters 46 and receivers 50 are configured to communicate bi-directionally (wirelessly through an antenna 48 or with other devices not shown such as a server. The processor 40 is preferably an intelligent hardware device, e.g., a central processing unit (CPU) such as those made by ARM®, Intel® Corporation, or AMD®, a microcontroller, an application specific integrated circuit (ASIC), etc. The processor 40 could comprise multiple separate physical entities that can be distributed in the AP 14. The memory 42 includes random access memory (RAM) and read-only memory (ROM). The memory 42 is a processor-readable storage medium that stores the software 44 which is processor-readable, processor-executable software code containing processor-readable instructions that are configured to, when executed, cause the processor 40 to perform various functions described herein. Alternatively, the software 44 may not be directly executable by the processor 40 but configured to cause the processor 40, e.g., when compiled and executed, to perform the functions. The network interface 52 is configured to communicate bi-directionally with the network 19 (FIG. 2).

Figure 5:
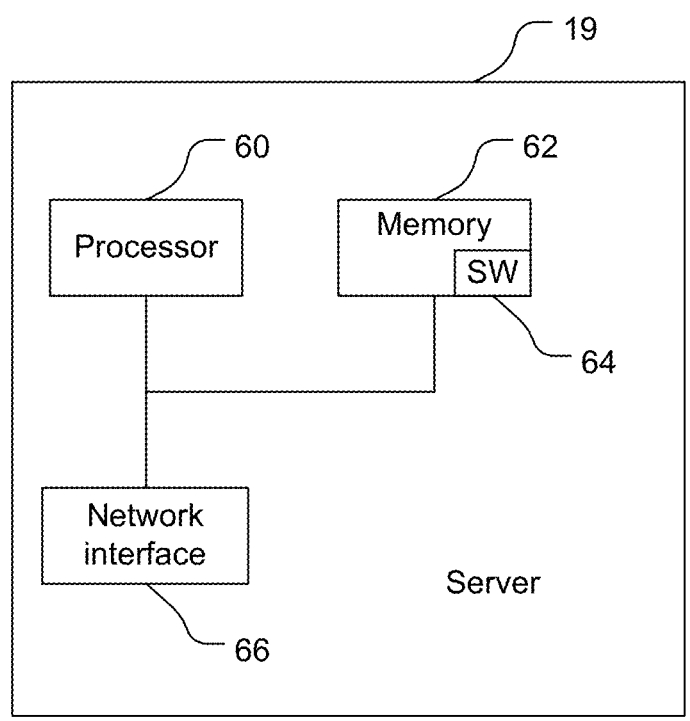
FIG. 5 is a block diagram of a server shown in FIG. 2.

Referring to FIG. 5, the server 19 comprises a computer system including a processor 60, memory 62 including software 64, and a network interface 66. The processor 60 is preferably an intelligent hardware device, e.g., a central processing unit (CPU) such as those made by ARM®, Intel® Corporation, or AMD®, a microcontroller, an application specific integrated circuit (ASIC), etc. The processor 60 could comprise multiple separate physical entities that can be distributed in the server 19. The memory 62 includes random access memory (RAM) and read-only memory (ROM). The memory 62 is a processor-readable storage medium that stores the software 64 which is processor-readable, processor-executable software code containing processor-readable instructions that are configured to, when executed, cause the processor 60 to perform various functions described herein (although the description may refer only to the processor 60 performing the functions). Alternatively, the software 64 may not be directly executable by the processor 60 but configured to cause the processor 60, e.g., when compiled and executed, to perform the functions. The network interface 66 is configured to communicate bi-directionally with the network 18 (FIG. 2) to send communications to and receive communications from the BTS 16 and/or the APs 14 through the network 18.

Figure 6:
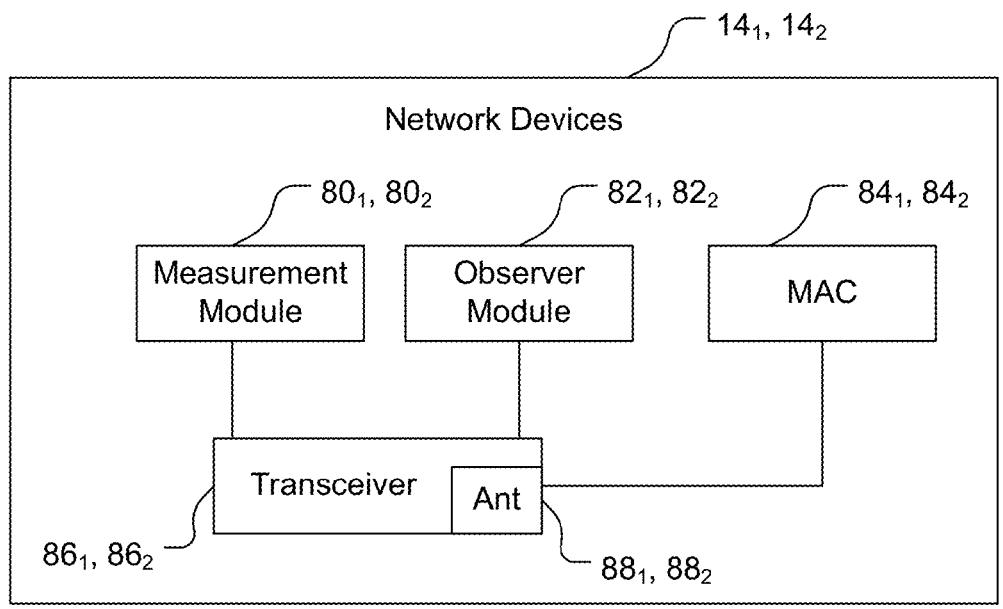
FIG. 6 is a partially functional block diagram of network devices shown in FIG. 2.

Referring to FIG. 6, network devices, here the APs $14_1$, $14_2$ shown in FIG. 2, each include the components shown. Each of the APs $14_1$, $14_2$, respectively, includes functional elements of a measurement module $80_1$, $80_2$, an observer module $82_1$, $82_2$, a MAC $84_1$, $84_2$, and includes a transceiver $86_1$, $86_2$ that each comprises the transmitters 46, the antennas 48, and the receivers 50 shown in FIG. 4. The modules 80, 82 are each implemented, e.g., by the processor 40 and the memory 42, including the software 44. The measurement modules 80 are configured to obtain (e.g., access or prepare) a message and send the message via the transceivers 86 toward the MS 12 and to receive via the transceivers 86 the acknowledgement from the MS 12. The measurement modules 80 are further configured to send indications of the transmit time of the message from the MACs 84 and the receipt time of the acknowledgement at the MACs 84 toward the server 19. The modules 80, 82 of each of the APs $14_1$, $14_2$ are further configured to work with the module 80, 82 of other network devices, e.g., other APs 14, to determine a transmit time from a message leaving the MAC 84 of one AP 14 to arriving at the MAC 84 of the other AP 14. The observer modules 82 are configured to receive via the transceivers 86 the acknowledgement from the MS 12 and to send an indication of the receipt time of the acknowledgement at the MAC 84 toward the server 19. These functions are discussed further below with respect to FIG. 8.

Observer-Based Time-of-Arrival

The following provides a discussion of observer-based time-of-arrival (TOA) determination to find an accurate position (location) for a target device, that is a network device with an unknown position, using multiple network devices with known positions. Measurements can be performed using one or more observer APs 14 to reduce or even eliminate dependence on variable SIFS ACK signal turnaround time. The discussion below focuses on determining a position of the mobile device 12. The techniques discussed, however, may be applied to determine a position of another device, e.g., any network device such as any of the network devices 12, 14, 16 shown in FIG. 2. Techniques discussed are directed to determining a position of a target device with an unknown position by taking measurements using at least two devices with known positions, and processing results of these measurements to determine the position of a target device. In particular, techniques are discussed for determining a position of a network device with an unknown position, and that is in a responding mode, using network devices with known positions. The discussions, however, are examples and not limiting of the scope of the disclosure.

Figure 7:
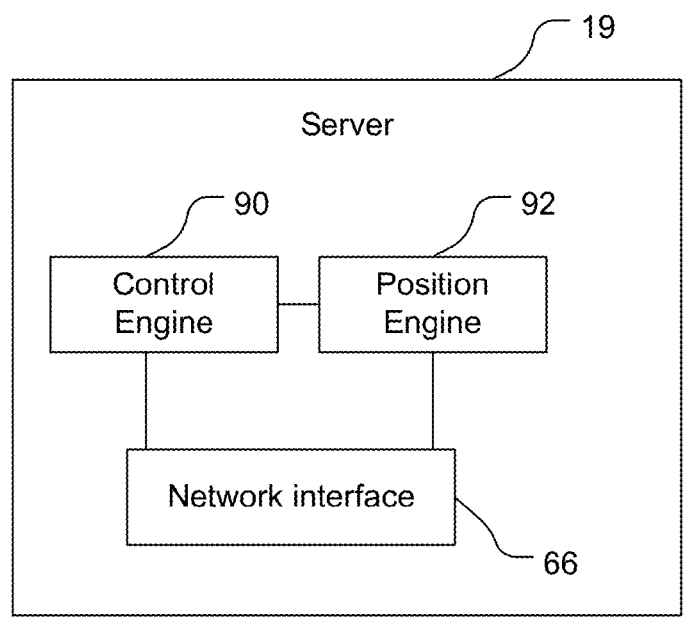
FIG. 7 is a partially functional block diagram of the server shown in FIG. 2.

Referring to FIG. 7, the server 19 includes a control engine (controlling means or control means) 90, and a position engine (positioning means or position determining means) 92. The engines 90, 92 are functional modules implemented by the processor 60 and the software 64 stored in the memory 62. Thus, reference to the engines 90, 92 performing or being configured to perform a function is shorthand for the processor 60 performing or being configured to perform the function in accordance with the software 64 (and/or firmware, and/or hardware of the processor 60). Similarly, reference to the processor 60 performing a controlling or position determination function is equivalent to the control engine 90 or the position engine 92, respectively, performing the function. The control engine 90 is communicatively coupled to the position engine 92, e.g., to share information to be used to determine the target device's position (e.g., which network device(s) is(are) a measurement network device(s) and which network device(s) is(are) an observer network device(s)). The control engine 90 is communicatively coupled to the network interface 66 for instructing (e.g., for sending control instructions to instruct)

the network devices and for receiving indications of status of the network devices (e.g., measurements complete). The position engine 92 is communicatively coupled to the network interface 66 for receiving timing information and other information (e.g., positions of known-position devices) from the network devices, and sending position indications of positions of target devices.

The control engine 90 is configured to control the access points 14 to obtain and report observer-based time-of-arrival information. The control engine 90 is configured to select network devices, 12, 14, 16, e.g., access points 14, as measurement-observer combinations (e.g., pairs), and to send signals/commands to the selected network devices 12, 14, 16 to indicate to the selected network devices 12, 14, 16 that the selected network devices 12, 14, 16 have been selected as a measurement-observer combination or measurement-observer combinations. The control engine 90 is also configured to cause the selected measurement-observer combination(s) to initiate measurements, and to provide parameter information about the measurements, e.g., an amount of time to be used for measurements. In particular, the network devices 12, 14, 16 are configured to change from a home channel to a measurement channel, send measurement signals for use in RTT and TOA determinations, track times of transmission and arrival of the test signals, and report the times of transmission and arrival (timing information) to the server 19, in particular to the position engine 92, as measurement information.

The position engine 92 is configured to determine a position of a target device, e.g., the mobile device 12, based on the reported measurement information from the measurement-observer combination(s) and other appropriate information. The position engine 92 is configured to obtain, e.g., receive and collect, measurement information obtained during measurements by the measurement-observer combination(s) of the selected network devices 12, 14, 16. The position engine 92 is further configured to use the measurement information to determine a position (location) of the target device.

Figure 8:
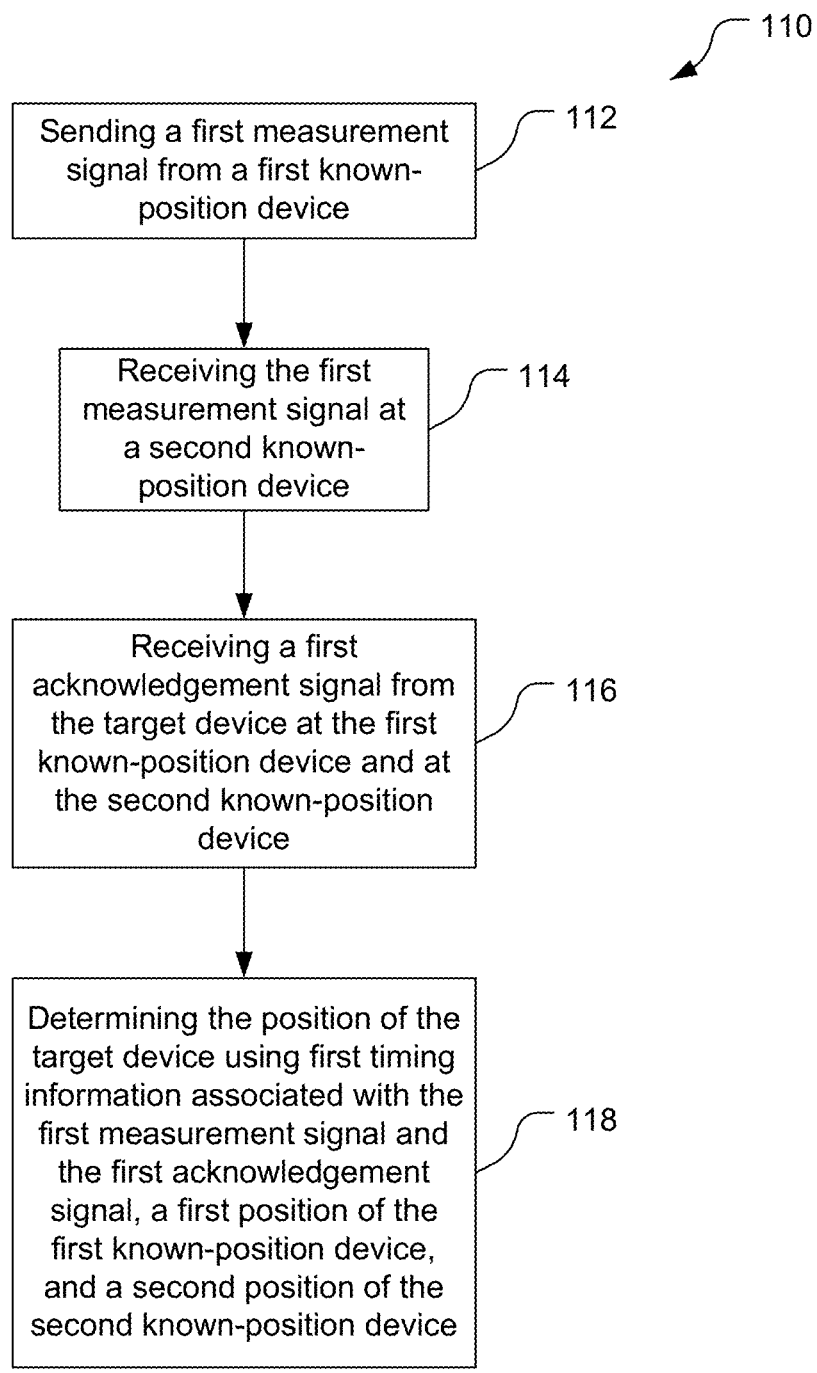
FIGS. 8-10 are block flow diagrams processes of determining a position of the target device.

Referring to FIG. 8, with further reference to FIGS. 2-7, a process 110 of determining the position of the mobile device 12 using observer-based TOA information includes the stages shown. The process 110 is, however, an example only and not limiting. The process 110 can be altered, e.g., by having stages added, removed, rearranged, combined, performed concurrently, and/or having single stages split into multiple stages. The process 110 discusses an example of determining the position of the mobile device 12 as the target device using the APs $14_1$, $14_2$ as a measurement-observer combination, here a measurement-observer pair. The process 110, however, may be used for different combinations of network devices, i.e., other than with the mobile device 12 as the target device and/or other than with the APs $14_1$, $14_2$ used as a measurement-observer combination.

At stage 112, the process 110 includes sending a first measurement signal from a first known-position device. For example, the first known-position device may be a measurement access point such as the AP $14_1$, having a first known position. In this example, the measurement AP $14_1$, in particular the measurement module $80_1$, wirelessly broadcasts a measurement signal (MS) that can be received by an observer device and the target device, in this example the observer AP $14_2$ (having a second known position) and the mobile device 12, respectively.

At stage 114, the process 110 includes receiving the first measurement signal at a second known-position device.

Continuing the example, the observer AP $14_2$ wirelessly receives the measurement signal MS from the measurement AP $14_1$.

At stage 116, the process 110 includes receiving a first acknowledgement signal from the target device at the first known-position device and at the second known-position device. Continuing the example, the mobile device 12 is in a responding mode and wirelessly sends an acknowledgement signal (ACK) in response to receiving the measurement signal MS. Stage 116 includes the measurement AP $14_1$ and the observer AP $14_2$ wirelessly receiving this acknowledgement signal ACK.

At stage 118, the process 110 includes determining the position of the target device using first timing information associated with the first measurement signal and the first acknowledgement signal, a first position of the first known-position device, and a second position of the second known-position device. Continuing the example, the measurement AP $14_1$ and the observer AP $14_2$ send timing information regarding receipt times of the measurement signal MS and the acknowledgement signal ACK to the server (FIG. 2). The server 19, in particular the position engine 92, uses the timing information to determine the position of the mobile device 12.

Figure 9:
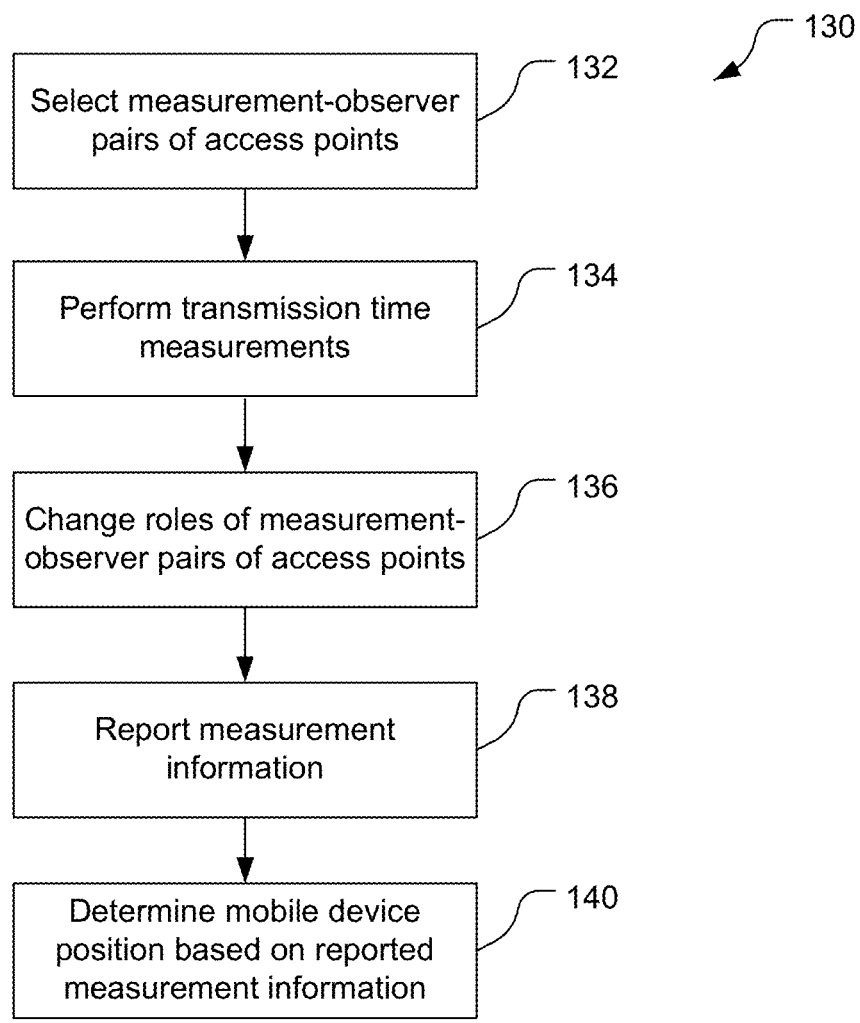

Referring to FIG. 9, with further reference to FIGS. 2-7, a process 130 of determining the position of a target device using observer-based TOA information includes the stages shown. The process 130 is, however, an example only and not limiting. The process 130 can be altered, e.g., by having stages added, removed, rearranged, combined, performed concurrently, and/or having single stages split into multiple stages. For example, stage 138 could be split into two stages, with measurement information with access points in first roles reported before stage 136, where the roles are changed. Further, stage 136 could be eliminated. Still other alterations to the process 130 as shown and described are possible. The process 130 discusses an example of determining the position of the mobile device 12 as the target device using the APs $14_1$, $14_2$ as a measurement-observer combination, here a measurement-observer pair. The process 130, however, may be used for different combinations of network devices, i.e., other than with the mobile device 12 as the target device and/or other than with the APs $14_1$, $14_2$ used as a measurement-observer combination.

At stage 132, the server 19 selects measurement-observer pairs of the access points 14. For example, the control engine 90 sends instructions to the access points $14_1$, $14_2$ to be a measurement-observer pair, e.g., to cause the access point $14_1$ to be a measurement network device (here a measurement AP) and to cause the access point $14_2$ to be an observer network device (here an observer AP). The control engine 90 thus instructs the access point $14_1$ to act as a measurement network device and the access point $14_2$ to act as an observer network device concurrently. That is, the access point $14_1$ will act as a measurement network device currently with the access point $14_2$ acting as an observer network device based on instruction from the control engine 90. The control engine 90 sends instructions to other pairs of the access points 14 to be separate measurement-observer pairs separate from the access points $14_1$, $14_2$. For example, the control engine 90 may send signals to eight of the access points 14 to form four separate measurement-observer pairs, although other quantities of measurement-observer pairs may be used. Further, the control engine 90 may limit the quantity of access points 14 performing timing measurements at a given time in a given area, e.g., to four (two measurement-observer pairs). The remaining discussion of the process 130 focuses on one measurement-observer pair containing the access points $14_1$, $14_2$, but the discussion applies to other access points 14 as well.

At stage 134, the access points $14_1$, $14_2$ perform time measurements. The access points $14_1$, $14_2$ respond to the instructions from the server 19 by setting their respective currently-used communication channels to a common (i.e., the same) measurement channel (e.g., changing from a home channel as appropriate) and performing measurements. At first, the access point $14_1$ is the measurement AP and the access point $14_2$ is the observer AP. The access points $14_1$, $14_2$ perform a TSF (time synchronization function) sync to a 5 connected access point of the access points $14_1$, $14_2$, targeting the primary connected access point's next beacon time. The access point $14_1$ starts measurement frames exchange at the next beacon time and the access point $14_2$ observes. Here, the access point $14_1$ sends a measurement signal that is received by the mobile device 12 and the access point $14_2$. The mobile device 12 responds to receiving the measurement signal by sending an acknowledgement signal. The acknowledgement signal is received by the access points $14_1$, $14_2$. The access points $14_1$, $14_2$ determine the time of transmission of the measurement signal and the times of receipt of the measurement signal and the acknowledgement signal. These times may be stored, at least temporarily (e.g., as part of shift registers or in the memory 42), for transmission to the server 19.

At stage 136, the roles of the access points $14_1$, $14_2$ change. The measurement AP sends a measurement-complete indication or exchange message to the observer AP when the measurements by the measurement AP are done. The measurement AP responds to the sending of this indication or message by becoming the observer AP and the observer AP responds to receiving this indication or message by becoming the measurement AP and thereafter acting as the measurement AP including sending an MS. The transmission time measurements of stage 134 are repeated with the access points $14_1$, $14_2$ in their new roles. The access points $14_1$, $14_2$ attempt to complete their measurements (as measurement AP and observer AP combined) in a designated interval, e.g., a 32 ms interval. If the measurements are not completed within the designated time period, the present measurement AP, here the access point $14_2$, coordinates with the observer AP to continue measurements within the same beacon interval. This stage may be omitted, but may improve efficiency by increasing measurements obtained for a single change in channels to the measurement channel by the access points $14_1$, $14_2$.

At stage 138, the measurement information collected by the access points $14_1$, $14_2$ during the transmission time measurements is reported. The access points $14_1$, $14_2$ collect information about the measurements and report the collected information to the position engine 92 of the server 19. Timing information from the transmission time measurements may be reported at one or more times, e.g., when the information is obtained, at the transition between roles of the access points $14_1$, $14_2$, or after all timing measurements are completed, etc. Each of the access points $14_1$, $14_2$ changes its currently-used communication channel to a communication channel other than the measurement channel, e.g., to their respective home channels. The currently-used communication channels of the access points $14_1$, $14_2$ may or may not be the same channel. If there are more measurement-observer pairs of access points 14 that have not yet obtained and reported measurement information, then those access points 14 change their currently-used communication channels the measurement channel and the process 130 returns to stage 134.

At stage 140, the server 19 determines the position of the mobile device 12 based on the reported measurement information. The position engine 92 uses the reported timing information from one or more, preferably all, of the measurement-observer pairs, in combination with locations of the access points 14 to determine the location of the mobile device 12. If a desired accuracy of position of the mobile device 12 is not achieved (e.g., a horizontal estimated position error (HEPE) being undesirable (e.g., exceeding a threshold)), then the process 130 will return to stage 132 and the control engine 90 will select a different set of access points 14 to use as measurement-observer pairs, although some of the newly selected access points 14 may have been used previously in a measurement-observer pair. The measurements (e.g., timing measurements) obtained from the newly selected set of access points may then be used to determine the location of the mobile device (e.g., using the new measurements together with previously obtained measurements). In some embodiments, the measurements from the newly selected set of access points may be used to determine the location of the mobile device while taking into consideration only some (or none) of previously obtained measurements using earlier selected sets of access points. Alternatively, the position determination could be made at an entity other than the server 19 in the system 10, with the other entity obtaining the timing information and having or obtaining other relevant information for determining the position of the mobile device 12.

Figure 10:
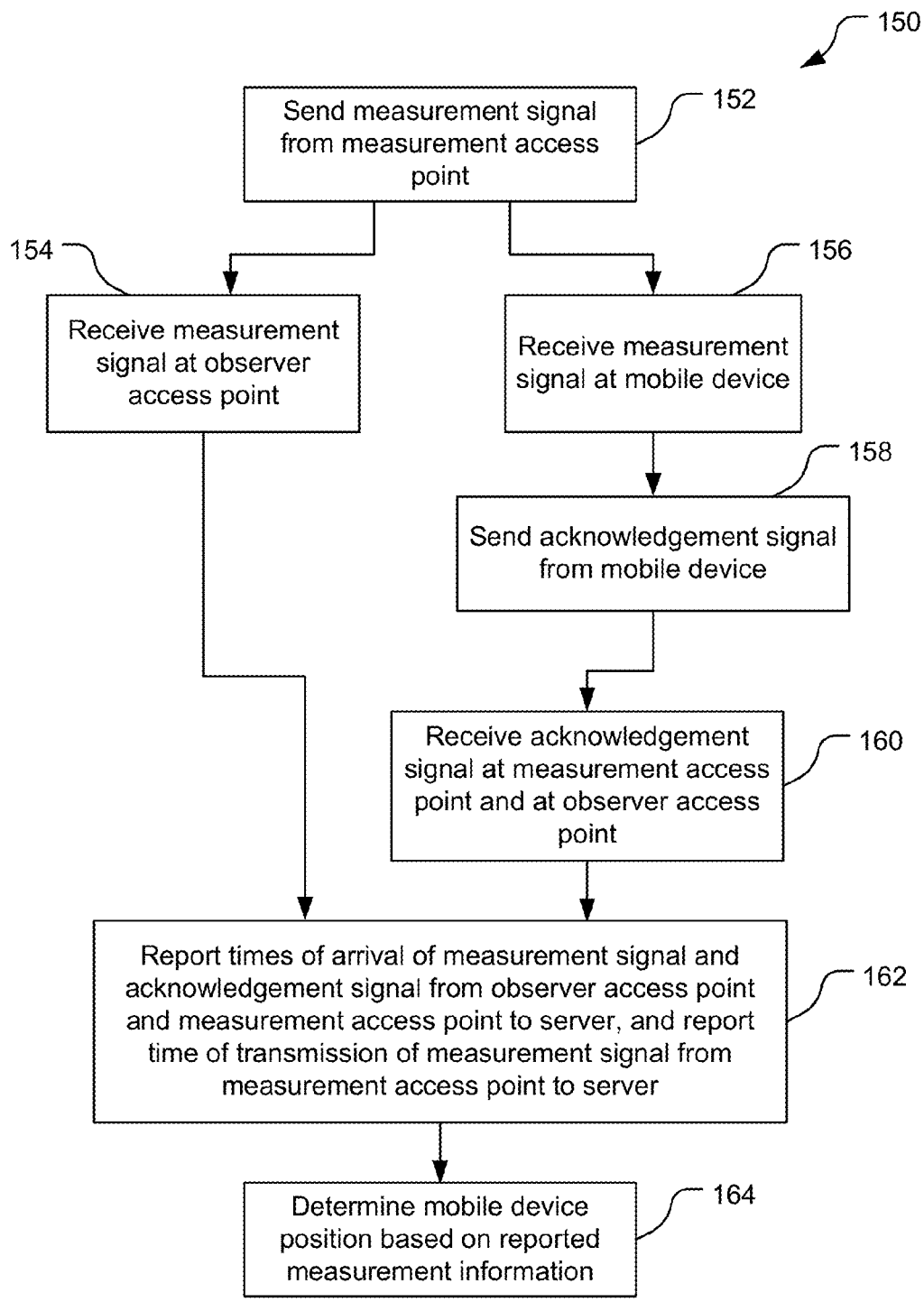
Figure 11:
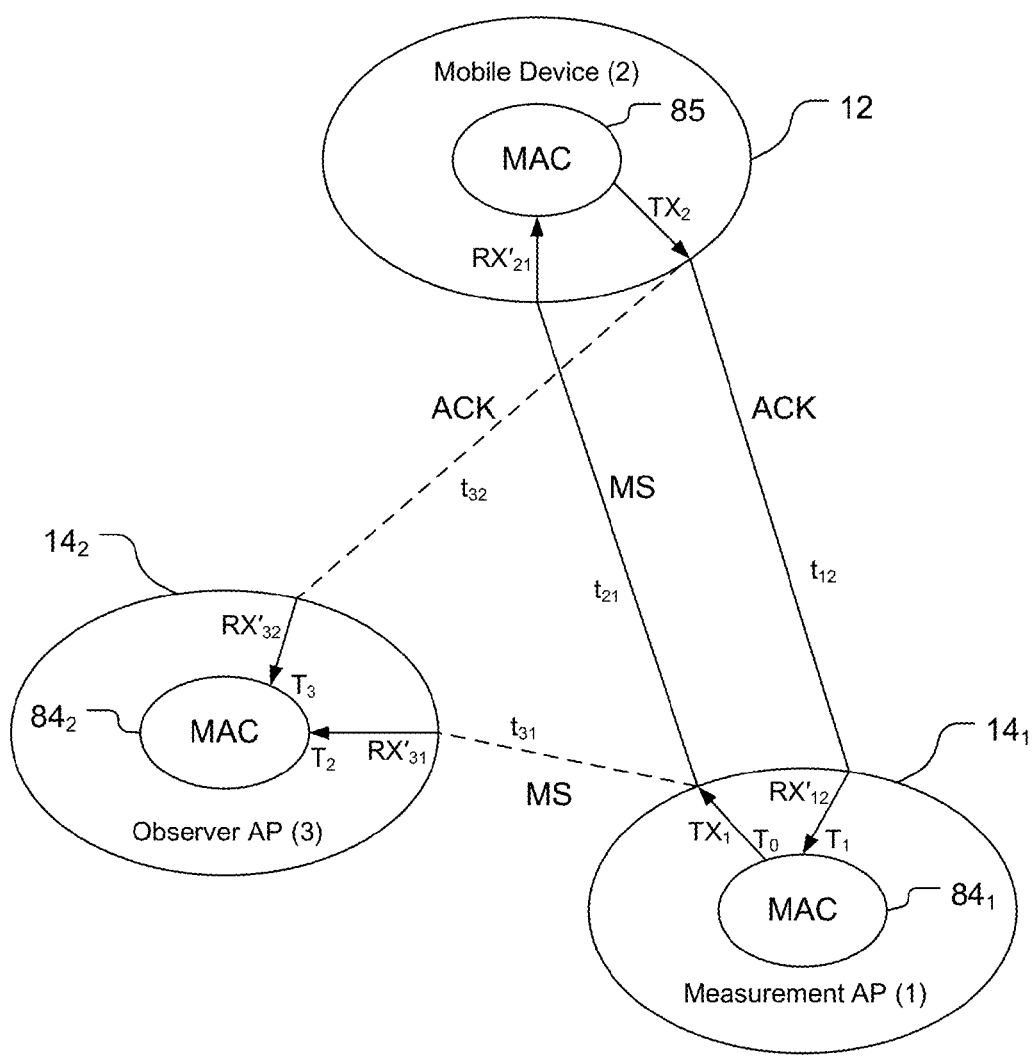
FIG. 11 is a schematic diagram of timing measurements between network devices.

Referring to FIG. 10, with further reference to FIGS. 2-7 and 11, a process 150 of determining the position of a target device, here the mobile device 12, using observer-based TOA information includes the stages shown. The process 150 is, however, an example only and not limiting. The process 150 can be altered, e.g., by having stages added, removed, rearranged, combined, performed concurrently, and/or having single stages split into multiple stages. The process 150 discusses an example of determining the position of the mobile device 12 as the target device using the APs $14_1$, $14_2$ as a measurement-observer combination, here a measurement-observer pair with known positions (i.e., a measurement-observer known-position device pair). The process 150, however, may be used for different combinations of network devices, i.e., other than with the mobile device 12 as the target device and/or other than with the APs $14_1$, $14_2$ used as a measurement-observer combination. The discussion below regarding the process 150 focuses on the access points $14_1$, $14_2$, e.g., after being selected as a measurement-observer pair (see stage 132 of FIG. 9), but the discussion applies to other access points 14 as well. For simplicity in subscripts, the measurement AP shown in FIG. 11 is designated as a measurement AP (1), the observer AP is designated as an observer AP (3), and the mobile device 12 is designated as a mobile device (2). The outer ovals for the access points $14_1$, $14_2$, represent timing of signals leaving from or reaching one or more of the antennas 48, the outer oval for the mobile device 12 represents timing of signals leaving from or reaching one or more of the antennas 28, and the inner ovals of the access points $14_1$, $14_2$, and the mobile device 12 represent timing of signals leaving from or reaching the MACs 84, 85, respectively.

At stage 152, the access points $14_1$, initially being the measurement AP, sends a measurement signal (MS) toward the mobile device 12 and the access points $14_2$. Having been selected, the access points $14_1$, $14_2$, change to the same measurement channel and the access point $14_1$ broadcasts the MS so that the MS can be received by the mobile device 12 and the observer AP, initially the access points $14_2$. The MS is initiated in the MAC $84_1$ and sent through the transceiver $86_1$ including through the antenna $88_1$. The amount of time for the MS to transfer (i.e., the transfer time) from the MAC $84_1$ out the antenna $88_1$ is represented in FIG. 11 as $TX_1$. The time (i.e., the moment in time) that the MS leaves the MAC $84_1$ is the time of transmission and is represented in FIG. 11 as $T_0$. The measurement AP (here the access point $14_1$) stores the time $T_0$ (i.e., the time of transmission of the MS from the MAC 84 of the measurement AP) in its memory 42.

At stage 154, the access point $14_2$, initially being the observer AP, receives the MS. The access point $14_2$ receives the MS through the transceiver $86_2$, including the antenna $88_2$, and into the MAC $84_2$. The amount of time for the MS to transfer from the antenna $88_1$ of the access point $14_1$ to the antenna $88_2$ of the access point $14_2$ is represented in FIG. 11 as $t_{31}$. The amount of time for the MS to transfer from the antenna $88_2$ to the MAC $84_2$ is represented in FIG. 11 as $RX'_{31}$. The time of arrival (TOA) of the MS (i.e., the moment in time that the MS arrives) at the MAC $84_2$ is represented in FIG. 11 as $T_2$. The observer AP (here the access point $14_2$) stores the time $T_2$ in its memory 42.

At stage 154, the mobile device 12 receives the MS. The mobile device 12 receives the same MS that the observer AP received. The mobile device 12 receives the MS through the antenna 28 and the receiver 30 and into a MAC 85. The amount of time for the MS to transfer from the antenna $88_1$ of the access point $14_1$ to the antenna 28 of the mobile device 12 is represented in FIG. 11 as $t_{21}$. The amount of time for the MS to transfer from the antenna 28 to the MAC 85 is represented in FIG. 11 as $RX'_{21}$.

At stage 158, the mobile device 12 sends an acknowledgement (ACK) signal. The mobile device 12 responds to receiving the MS signal by broadcasting the ACK signal so that the ACK signal can be received by the measurement AP (initially the access point $14_1$) and the observer AP (initially the access point $14_2$).

At stage 160, the ACK signal is received at the measurement AP and at the observer AP. The access point $14_2$ (at this time, the observer AP) receives the ACK signal through the transceiver $86_2$, including the antenna $88_2$, and into the MAC $84_2$. The amount of time for the ACK signal to transfer from the antenna 28 of the mobile device 12 to the antenna $88_2$ of the access point $14_2$ is represented in FIG. 11 as $t_{32}$. The amount of time for the ACK signal to transfer from the antenna $88_2$ to the MAC $84_2$ is represented in FIG. 11 as $RX'_{32}$. The TOA of the ACK signal at the MAC $84_2$ is represented in FIG. 11 as $T_3$. The access point $14_2$ (here the observer AP) stores the time $T_3$ in its memory 42. The access point $14_1$ (at this time, the measurement AP) receives the ACK signal through the transceiver $86_1$, including the antenna $88_1$, and into the MAC $84_1$. The transmission time, i.e., the amount of time for the ACK signal to transfer from the antenna 28 of the mobile device 12 to the antenna $88_1$ of the access point $14_1$, is represented in FIG. 11 as $t_{12}$ (where the transmission time $t_{12}$ equals the amount of time $t_{21}$). The amount of time for the ACK signal to transfer from the antenna $88_1$ to the MAC $84_1$ is represented in FIG. 11 as $RX'_{12}$. The TOA of the ACK signal at the MAC $84_1$ is represented in FIG. 11 as $T_1$. The access point $14_1$ (here the measurement AP) stores the time $T_1$ in its memory 42.

At stage 162, the times of arrival of the MS and the ACK signal, and the time of transmission of the MS, are reported to the server 19. The access points $14_1$, $14_2$, respectively, send the time of transmission $T_0$ of the MS and the arrival time $T_1$ of the ACK signal, and the arrival time $T_2$ of the MS and the arrival time $T_3$ of the ACK signal at the respective MACs 84 to the position engine 92 of the server 19. As discussed above, these times may be reported at various times, e.g., before the access points $14_1$, $14_2$ change measurement and observer roles, or after changing roles (i.e., the access point $14_1$ changing to the observer AP and the access point $14_2$ changing to the measurement AP), as soon as the times are measured or otherwise determined, after all measurements are completed for the measurement-observer pair, etc.

At stage 164, the server 19 determines the mobile device position based on the reported measurement information. The position engine 92 uses the reported transmission and arrival times to determine the transfer times between the mobile device 12 and the access points $14_1$, $14_2$. The position engine 92 will use these times, the known locations of the access points $14_1$, $14_2$, and other appropriate information (e.g., the speed of light) to determine distances (which may be estimated distances) from the access points $14_1$, $14_2$ to the mobile device 12, and thus the position of the mobile device 12 using trilateration. The process 150 can be performed for one or more further measurement-observer known-position device pairs to obtain further timing information and to use the further timing information, alone or in combination with the timing information obtained from the measurement-observer pair of the access points $14_1$, $14_2$, to determine the position of the mobile device 12, e.g., using trilateration.

The position engine 92 is configured to determine a difference in the transfer times between the mobile device 12 and the access points $14_1$, $14_2$. To do this, the position engine is configured to determine a difference between (1) a difference between the arrival time $T_1$ of the ACK signal at the measurement AP and the time of transmission $T_0$ of the MS by the measurement AP and (2) a difference between the arrival time $T_3$ of the ACK signal at the observer AP and the arrival time $T_2$ of the ACK signal at the observer AP. The difference between the arrival time $T_1$ of the ACK signal at the measurement AP and the time of transmission $T_0$ of the MS by the measurement AP is given by:

$$T_1 - T_0 = TX_1 + t_{21} + RX'_{21} + \text{SIFS} + TX_2 + t_{12} + RX'_{12} \qquad (2)$$

where SIFS (short inter-frame space) is a turnaround time of the MAC 85 of the mobile device 12 from receipt of the MS at the MAC 85 to transmission of the ACK signal from the MAC 85. The difference between the arrival time $T_3$ of the ACK signal at the observer AP and the arrival time $T_2$ of the ACK signal at the observer AP is given by:

$$T_3 - T_2 = t_{21} + RX'_{21} + \text{SIFS} + TX_2 + t_{32} + RX'_{32} - (t_{31} + RX'_{31}) \qquad (3)$$

Taking the difference between Eqn. (1) and Eqn. (2) yields:

$$(T_1 - T_0) - (T_3 - T_2) = t_{12} - t_{32} + RX'_{12} + RX'_{32} + t_{31} + TX_1 + RX'_{31} \qquad (4)$$

where the expression $t_{31} + TX_1 + RX'_{31}$ is a determinable constant and the terms $RX'_{12}$ and $RX'_{32}$ are known values for the measurement AP and the observer AP, respectively. The value of the expression $t_{31} + TX_1 + RX'_{31}$ is the transmission time from the MAC 84 of the measurement AP to the MAC 84 of the observer AP and can be determined by determining a difference of the arrival time $T_2$ of the MS at the MAC 84 of the observer AP and the time of transmission $T_0$ of the MS from the MAC 84 of the measurement AP. This value may be determined in the background between the measurement and observer APs, i.e., separate from the process 150, e.g., by sending a test signal and determining the travel time from the MAC of the measurement AP to the MAC of the observer AP. The values of the terms $RX'_{12}$ and $RX'_{32}$ can be determined during manufacture of the access points 14 and stored in their respective memories 22, predetermined values for these terms can be stored in the memories 22 of all the access points 14 in the system 10 without individual determination, the predetermined values can be stored in the memory 62, etc. Further, the values for the terms $RX'_{12}$ and $RX'_{32}$ may be assumed to be the same, e.g., where the values are not individually determined.

By evaluating Eqn. (4) with the known/determinable values discussed above, the position engine 92 can determine a value of the difference, $t_{12}-t_{32}$, in the transfer times between the mobile device 12 and the access points 14₁, 14₂. The position engine 92 is configured to determine the set of locations where this difference equals the determined value, which constitute possible locations for the mobile device 12. The position engine 92 can determine similar sets of locations with the measurement/observer roles of the access points 14₁, 14₂ reversed, as well as similar sets of locations for other measurement-observer pairs of access points 14. The position engine 92 is configured to determine the location of the mobile device 12 as the point that best satisfies the various sets of possible, estimated locations, determined from using the measurement-observer pairs.

Figure 12:
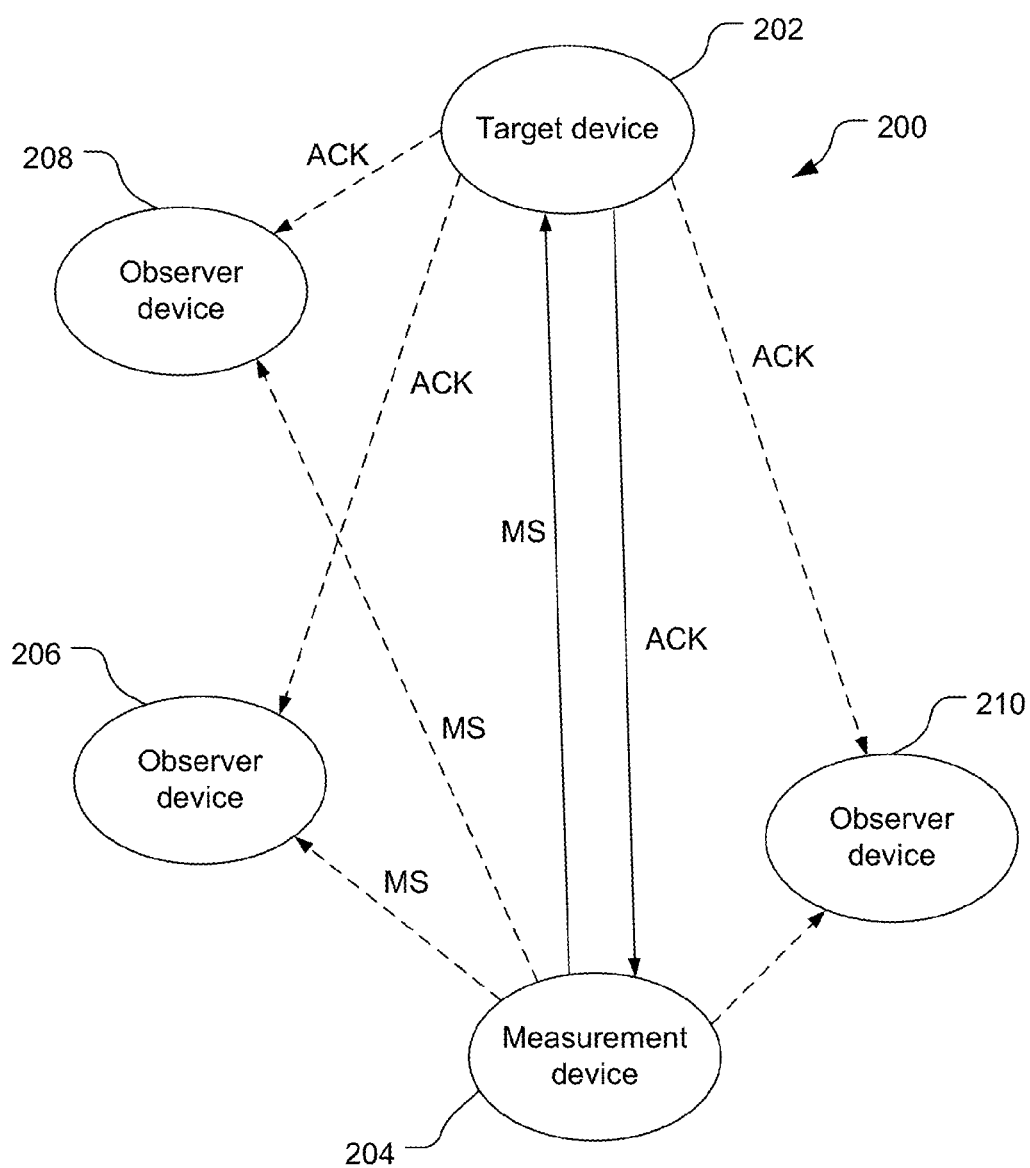
FIG. 12 is a schematic diagram of a timing measurements in combination of devices for locating a target device.

While the discussions above with respect to FIGS. 8-11 discussed examples with measurement-observer combinations of measurement-observer pairs, other combinations of devices may be used. For example, combinations with a target device, a measurement device, and multiple observer devices associated with the measurement device may be used, with the measurement device and the observer devices having known positions. Referring to FIG. 12, a combination 200 of devices includes a target device 202, a measurement device 204, and three observer devices 206, 208, 210. In cases with multiple observer devices for a single measurement device, the measurement signal MS sent by the measurement device is received by the multiple observer devices and the multiple observer devices provide their respective timing information to the server 19 and the position engine 92 determines position estimates of the target device using the information from the multiple observer devices. FIG. 12 shows only one measurement device, but there may be one or more other measurement devices associated with at least one observer device each. Any of these observer devices may be one of the observer devices 206, 208, 210, with the observer devices able to identify the source of the measurement signal MS and report this to the position engine 92 along with the corresponding timing information. Also in this case, the observer devices operate concurrently even though the measurement signal MS may arrive at the observer devices at different times and/or the acknowledgement signal ACK may arrive at the observer devices at different times and/or the observer devices may send their respective timing information at different times to the server 19. The devices initially serving as the multiple observer devices may be selected to send a measurement signal MS. For example, the control engine 90 may have one of these devices (e.g., the device 206) switch roles with the measurement device (e.g., the device 204), or may have more than one of these devices become measurement devices to set up different measurement-observer combinations (e.g., the devices 204 and 206 becoming measurement devices with the device 208 being paired as an observer device with the device 204 and the device 210 being paired as an observer device with the device 206). If a sufficient quantity (e.g., three or more) observer devices are used, then a position of the target device may be determined with desired accuracy (e.g., a HEPE within a desired threshold) without having to perform a further measurement (e.g., another device serving as a measurement device, be it one of the devices initially serving as one of the multiple observer devices, or another device).

Figure 13:
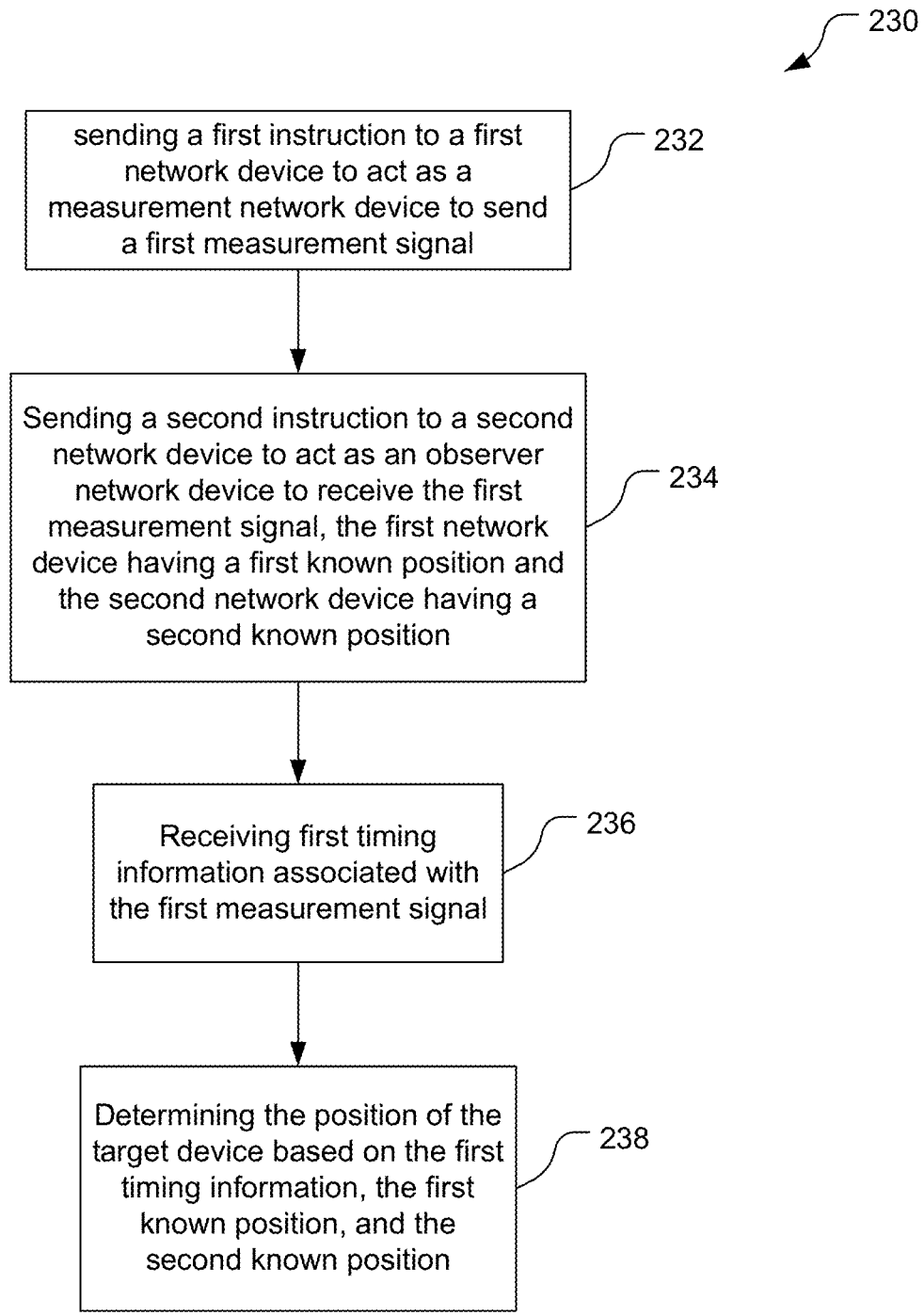
FIG. 13 is a block flow diagram of a method of determining a position of a target device.

Referring to FIG. 13, with further reference to FIGS. 2-7 and 11, a method 230 of determining the position of a target device, here the mobile device 12, using observer-based TOA information includes the stages shown. The process 230 is, however, an example only and not limiting. The process 230 can be altered, e.g., by having stages added, removed, rearranged, combined, performed concurrently, and/or having single stages split into multiple stages.

At stage 232, the method 230 includes sending a first instruction to a first network device to act as a measurement network device to send a first measurement signal. The control engine 90 of the server 19 can send a command signal to instruct a network device, e.g., the access point 14₁, to be a measurement device and, as such, to send a measurement signal.

At stage 234, the method 230 includes sending a second instruction to a second network device to act as an observer network device to receive the first measurement signal, the first network device having a first known position and the second network device having a second known position. The control engine 90 sends a command signal to a network device, e.g., the access point 14₂, to be an observer device. The access points 14₁, 14₂, have known positions.

At stage 236, the method 230 includes receiving first timing information associated with the first measurement signal. The access points 14₁, 14₂ send timing information associated with the measurement signal, e.g., time of transmission of the measurement signal, time of receipt of the measurement signal, and/or time or receipt of an acknowledgement signal sent by the mobile device 12 in response to receiving the measurement signal.

At stage 238, the method 230 includes determining the position of the target device based on the first timing information, the first known position, and the second known position. The position engine 92 collects the timing information and uses this in combination with the known positions of the access points 14₁, 14₂ to determine the position of the mobile device 12, e.g., by determining distances from the 14₁, 14₂ and using trilateration.

Further, while the discussion above focused on examples where the measurement device(s) sends a single measurement signal MS, other implementations may be used. For example, a measurement device may send multiple measurement signals. How many measurement signals the measurement device sends may vary, e.g., depending on a threshold amount of time, a threshold number of measurement signals, until the control engine 90 sends a command to stop sending the measurement signals (e.g., in response to the position engine 92 receiving timing information from a desired quantity (e.g., all) of the observer devices associated with the measurement device, etc.).

The measurement signal MS may take a variety of forms. For example, the measurement signal may be a single packet of information or multiple packets of information.

Figure 14:
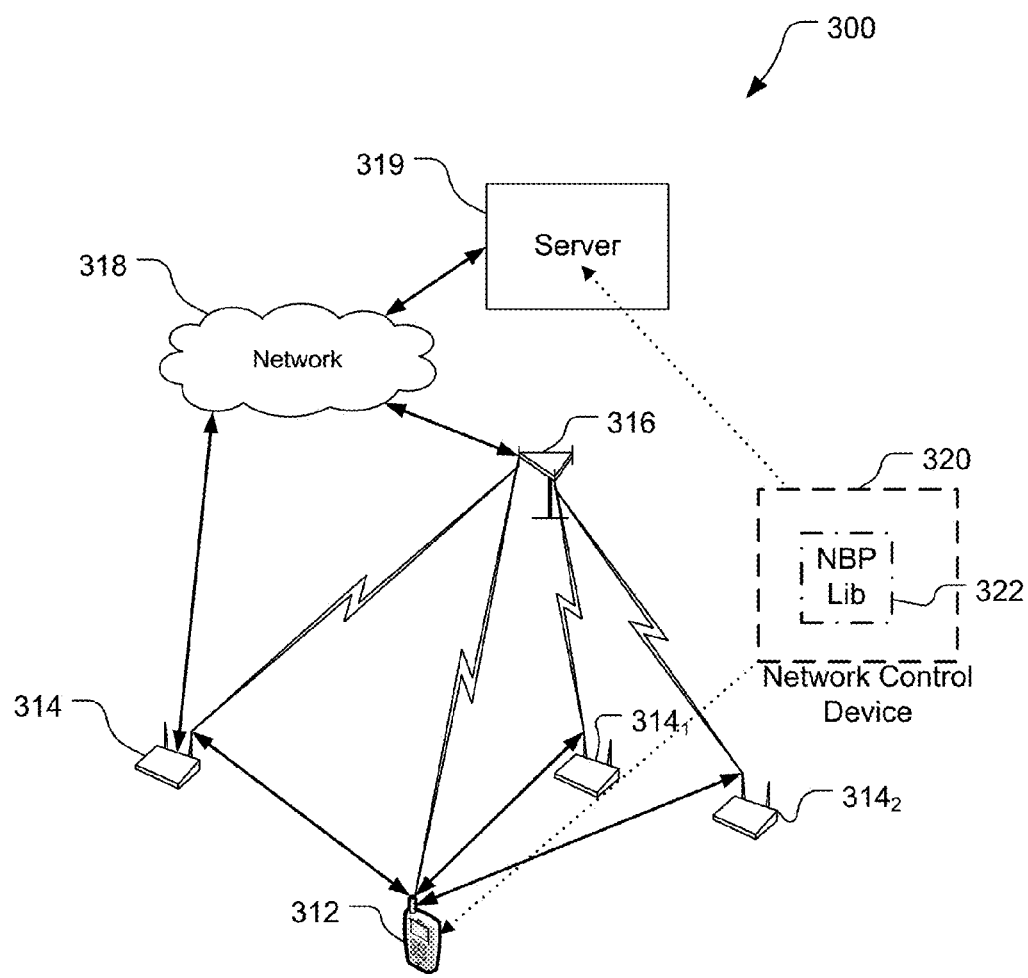
FIG. 14 is a schematic diagram of another example system to implement position determination for a mobile device using observer-based time of arrival measurements.

FIG. 14 is a schematic diagram illustrating another example system 300 to implement position determination for a target mobile device 312 (which may be similar to, and may be configured to perform at least some of the functions of, the example device 12 depicted in FIGS. 2, 3, and 11)

using observer-based time of arrival measurements. The example system 300 includes a network control device 320 configured to control selection of network devices/nodes, including such nodes as WWAN base station transceivers (such as the BTS 316, which may be similar to the BTS 16 of FIG. 2), WLAN access points (such as the access points 314, $314_1$, and $314_2$, which may be similar to any of the WLAN AP's 14, $14_1$, and $14_2$ depicted in FIG. 2), etc., and to control the selected devices/nodes to cause them to transmit measurements signals and/or to receive transmissions to enable determination of the position of the target mobile device 312 from timing measurements associated with transmission and receipt of signals, and from known positioning information for the devices/nodes being controlled. It is to be noted that, in some implementation, a measurement signal may comprise a plurality of packets that may then each be measured/observed by a receiving device (e.g., the target mobile device and/or the observer AP) to thus improve the accuracy of the measurements (e.g., via an averaging of the measurements performed on individual packets constituting a "measurement signal). Thus, for example, the network control device 320 may be configured, in some embodiments, to send a first instruction to a first network device (e.g., the network device $314_1$, selected from a plurality of known-position network devices) to act as a measurement network device to send a first measurement signal, send a second instruction to a second network device (e.g., $314_2$) to act as an observer network device to receive the first measurement signal, with the first and second network devices being associated with a first known position and a second known position, respectively. In some embodiments, the position of the target mobile device may be determined using just timing measurements/information associated with the first measurement signal and a first acknowledgement signal (transmitted by the target mobile device in response to receipt, by the target mobile device, of the first measurement signal), and the known positions of the first and second network devices. The target mobile device 312 may be associated with a primary AP, such as the AP 314 of FIG. 14, and accordingly the mobile device 312 may have an established communication link with that primary AP through which the mobile device 312 may perform data and/or voice communications.

In some embodiments, the network control device 320 may be further configured to send a third instruction to cause a change of roles of the first network device and the second network device following receipt of the first acknowledgement signal from the target mobile device 312 so that the second network device sends a second measurement signal to be received by the first network device, and the first network device and the second network device can receive a second acknowledgement signal sent from the target mobile device in response to receipt of the second measurement signal by the target mobile device. In some embodiments, the first network device and the second network device may change their roles in response to a measurement-complete indication or an exchange message communicated by the first network device following receipt of the first acknowledgement signal by the first network device (from the target mobile device) and completion of a measurement of the first acknowledgement signal by the first network device. In some embodiments, the network device that sent the measurement signal (that device is also referred to as the "measurer AP") may receive an instruction to reverse roles with the second network device, and may subsequently send an exchange message to the network device that received the measurement signal (the "observer AP") in response to receipt of the first acknowledgement signal (by the measurer AP) from the target mobile device. In such embodiments, the second measurement signal (i.e., from the AP $314_2$ in the present example) may be sent in response to receipt of the exchange message by the second network device (e.g., the exchange message may trigger the transmission of the second measurement signal by the second network device). The observer AP may have also received the 'reverse roles' instruction received by the first network device.

The position of the target mobile device may be determined based on timing measurements associated with the first measurement signal, the second measurement signal, the first acknowledgement signal, and the second acknowledgement signal, and based on the first known position and the second known position. The network control device can then select at least one other network device to perform additional measurements with another of the plurality of known-position network devices in response to a determination that a desired accuracy of the determined position of the target mobile device was not achieved, e.g., when a horizontal estimated position error (HEPE) is deemed undesirable because it exceeds some predetermined threshold. HEPE computations generally depend on the known positions of the pairs of network devices included in the position computation. In some situations, a prediction of the position error can be made from the subset of network device pairs, and thus a desired accuracy can be targeted by making an appropriate choice of device pairs and the number of pairs to be used.

As shown in FIG. 14, the network control device 320 may be a standalone device, e.g., a wireless device. The network control device 320 may include a network-based positioning library (also referred to as "NBP Lib") module 322, which may be implemented as hardware, software, or as a hardware-software combination, and is configured to perform some or all of the functions described herein in relation to the selection of network devices/nodes/access points, and control of such selected devices/nodes/access point, to enable observer-based time-of-arrival positioning operations. Thus, in some embodiments, the NBP Lib module 322 may be configured to identify and select pairs of network devices from a plurality of network devices (e.g., access points) with known positions (the known positions of the network devices/nodes/access points participating in the positioning determination operations may have been previously provided to the network control device through transmission of network assistance information from some remote device). Having selected the pairs of network devices/access points, the NBP Lib module 322 may be configured to designate one device of a selected pair as a measurer access point, and the other device of the selected pair as an observer access point. The NBP Lib module 322 may also be configured to send instructions (e.g., transmit a wireless control signal, via a transceiver of the network control device, and/or transmit a control signal over a wired network to one or more AP's coupled to such a wired network) to the selected pair of access points to cause the measurer access point to transmit a measurement signal that is to be received by the observer access point and by the target mobile device, and to cause the measurer access point and the observer access point to obtain timing measurements for a received acknowledgement signal sent from the target mobile device in response to receipt (by the target mobile device) of the first measurement signal. In some embodiments, when initiated, the selected measurer and observer access points may switch to a different channel (e.g., a measurement channel), and perform a TSF sync operation with, for example, the primary AP of the target mobile device 312 (e.g., the AP 314 in the example of FIG. 14, although, in some embodiments, either of the AP $314_1$ or $314_2$ may have previously been established as the primary AP). After performing the TSF sync operation, the measurer AP may commence performance of measurement frames exchange at the next beacon time, and send, in some embodiments, an exchange message (i.e., a message causing role-change between the measurer and observer AP's) to the observer AP when the measurements are done (the observer and measurer could then change role, with the observer AP becoming the measurer and sending a measurement signal). In some embodiments, the measurer and observer access points are configured to conclude the measurement/observation process within some specified time interval, e.g., 32 ms interval.

In some embodiments, to improve the position estimate for the target mobile device 312, the NBP Lib may select several pairs of access points to perform the measurer/observer operations described herein. For example, the NBP Lib module 322 may select four (4) pairs of measurer/observer access points, and transmit control signals to cause each pair to perform measurer/observer operations (e.g., to cause one of the access points to send a measurement signal, which may comprise one or more measurer packets, the other access point to receive the measurements signal, for both access points to receive an acknowledgement signal from the target mobile device, and, optionally, to reverse roles). More or fewer pairs of access points may be selected. In some embodiments, in addition to a determination of the position estimate of the target mobile device based on timing measurements for signals processed by each pair of access points, and based on the known positions of the participating access points, an accuracy metric corresponding to the position estimate may be computed. If the desired accuracy is not achieved (e.g., as determined from comparison of the computed accuracy metric to some threshold), the NBP Lib module may select another set of access points (e.g., another set including four pairs of access points) to obtain timing measurements/information from measurements performed through the newly selected set of access points, with that timing information being used to compute a new or revised position estimate for the target mobile device 312.

Figure 15:
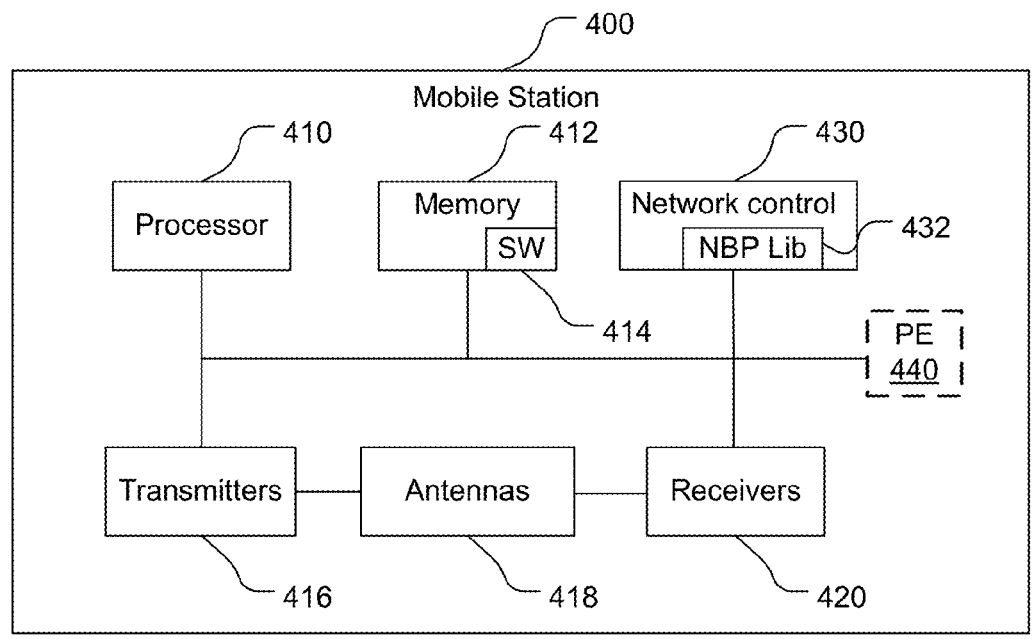
FIG. 15 is a schematic diagram of an example mobile device.

In some embodiments, the network control device 320 may be implemented at the target mobile device 312. In such embodiments, the network control device 320 (comprising the NBP Lib module 322) may be realized as a hardware and/or software a unit of the target mobile device 312, thus enabling the target mobile device 312 to directly initiate a position determination process by selecting at least two access point with which it can communicate to cause the time-of-arrival measurement and observation operations described herein. More particularly, FIG. 15 is a schematic diagram of an example mobile device 400, which may be similar to the mobile device 312 of FIG. 14. Similar to the example implementation of the mobile device 12 illustrated in FIG. 3, the mobile device 400 may include a processor 410 (e.g., a central processing unit (CPU) such as those made by ARM®, Intel® Corporation, or AMD®, a microcontroller, an application specific integrated circuit (ASIC), etc.), memory 412 (on which software code 414 may be stored), transmitters 416, antennas 418, and receivers 420. The transmitters 416, antennas 418, and receivers 420 implement a wireless communication module that can bi-directionally communicate with, for example, the network devices/nodes depicted in FIG. 14. The memory 412 is a processor-readable storage medium that may include random access memory (RAM) and/or read-only memory (ROM).

As further illustrated in FIG. 15, the mobile device 400 may include a network control unit 430, similar to the network control device 320, which may include an NBP Lib module (which may be similar to the NBP Lib module 322 of FIG. 14). In the example embodiments of FIG. 15, the network control unit 430 is depicted as a hardware-based module, and may include its own dedicated processor(s). However, as noted, the network control unit 430 may be implemented, at least partly, as a software module. In such embodiments, computer code to cause operations the network control unit is configured to perform may be stored at the memory 412 (e.g., at the software portion 414 of the memory), and the computer code implementation for the network control unit may be realized through execution of the code on the processor 410 of the mobile device 400.

Figure 16:
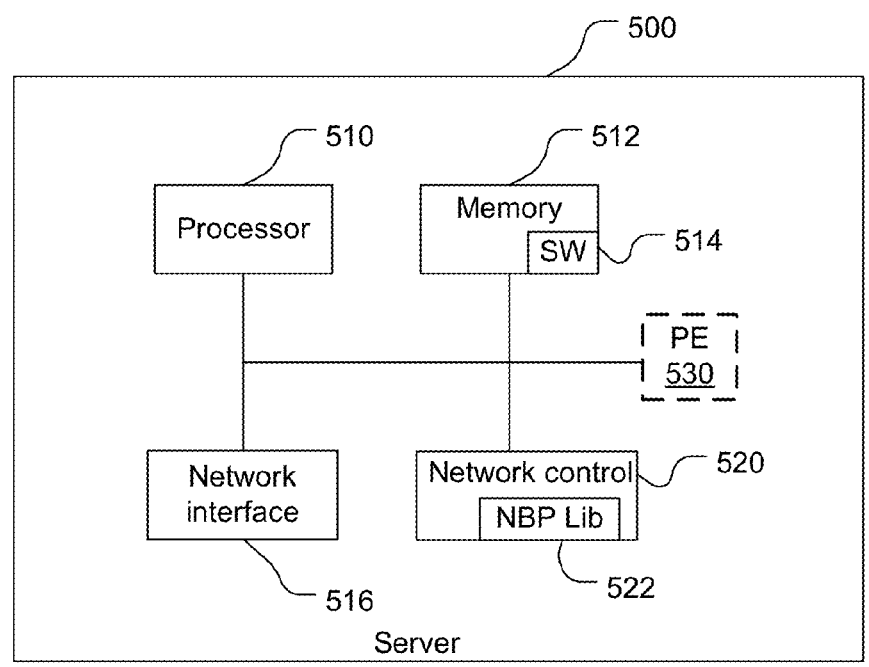
FIG. 16 is a schematic diagram of an example server implemented with a network control unit.

Turning back to FIG. 14, in some embodiments, the network control device 320 may be implemented at a remote server, such as the remote server 319. FIG. 16 is a schematic diagram of an example server 500 which is implemented with a network control unit 520 configured to perform operations similar to those performed by the network control device 320 of FIG. 14. The implementation of the example server 500 may be similar to the implementation of the server 19 depicted in FIGS. 5 and 7, and may thus include a processor 510 (e.g., a central processing unit (CPU) such as those made by ARM®, Intel® Corporation, or AMD®, a microcontroller, an application specific integrated circuit (ASIC), etc.), memory 512 (on which software 514 may be stored), and a network interface 516. The network interface 516 is configured to communicate bi-directionally with, for example, a network 318 of FIG. 14 (which may be similar to the network 18 of FIG. 2) in order to send communications to, and receive communications from, the BTS 316 and/or the APs 314, $314_1$, and/or $314_2$.

In embodiments in which the network control device 320 is implemented at a remote server such as the server 319, or is a standalone device in communication (e.g., wireless and/or wired communications) with the various network devices, the network control device may be configured to commence the measurement-and-observation procedure (i.e., to send control information/signals to the various network devices/nodes) in response to receipt of a request message from the target mobile device requesting that a position estimate for the target mobile device's location be determined. In some embodiments, the measurement-and-observation procedures described herein may be initiated by the network control device periodically, e.g., according to some predetermined schedule in which the system 300 operates to identify some or all user mobile devices in the area covered by the system 300, and to perform measurement-and-observation operations to determine position estimates for the mobile devices so identified. In some embodiments, the measurement-and-observations procedures described herein may be commenced in response to a request message received from some remote device (i.e., a device other than the target mobile device 312).

The network control device 320 may be configured to use timing information, collected by the access points the network control device is controlling, to determine the position of the target mobile device 312 (e.g., via implementation of trilateration procedures). Determination of a position estimate for the target mobile device 312 may be performed by a position engine (PE) implemented at the network control device, with such a position engine being realized as part of the NBP Lib module, or being realized as a separate dedicated unit (hardware and/or software implementation) of the network control device 320 or of the device/system comprising the network control device. For example, in FIG. 15, showing the schematic diagram of the example target mobile device 400 on which the network control unit 430 may be implemented, an optional positioning engine 440 may be realized as a dedicated unit (hardware and/or software) of the target device, but the PE 440 may, alternatively, be realized as part of the network control unit 430. Similarly, in the example server 500 illustrated in FIG. 16, a positioning engine 530 is illustrated as a dedicated hardware and/or software unit of the server 500, but may, alternatively, be implemented as part of the network control unit 520.

In embodiments in which the network control device is configured to determine the position of the target mobile device, the access points that are controlled by the network control device 320, e.g., the AP's $314_1$ and $314_2$ in the example of FIG. 14, obtain timing measurements corresponding to the signals transmitted/received by the AP's and the target mobile device 312. For example, when the AP $314_1$ acts as a measurer device and the AP $314_2$ acts as an observer device, the timing measurements/information collected by the AP $314_1$ include the transmission time of the measurement signal the AP $314_1$ was instructed to send and the time of arrival of an acknowledgement signal sent to the AP $314_1$, from the target mobile device 312, in response to receipt of the measurement signal. The timing measurements collected by the AP $314_2$ include, in this example, the time of arrival of the measurement signal transmitted by the AP $314_1$ and the time of arrival of the acknowledgement signal from the target mobile device 312. These timing measurements are then communicated to the network control device 320, where it is used, along with the known positions of the AP $314_1$ and $314_2$, to determine a position estimate for the target mobile device 312 (the position determination procedures performed may be similar to those described in relation to FIGS. 11 and 12). For example, a first value is computed as a difference between the arrival time at the measurer AP $314_1$ of the acknowledgement signal from the mobile device 312, and the transmission time of the measurement signal (by the measurer AP $314_1$). A second value is also computed as a difference between the time of arrival at the observer AP $314_2$ of the acknowledgement signal from the target mobile device 312, and the time of arrival at the observer AP $314_2$ of the measurement transmission from the AP $314_1$. The difference between the first value and the second value can be used to determine a value (such as the value $t_{12}$-$t_{32}$ derived in relation to FIG. 11), based on which, and based on known positions of the AP $314_1$ and $314_2$, possible locations of the target mobile device 312 can be determined. By repeating this procedure for a set of time-of-arrival measurements obtained when the roles of AP $314_1$ and AP $314_2$ are reversed, and/or when additional sets of time-of-arrival measurements from other AP pairs are obtained, a more accurate possible position estimate(s) for the target mobile device 312 can be determined. In some embodiments, position determination computations may be performed, at least in part, at wither of the measurer or observer AP.

Figure 17:
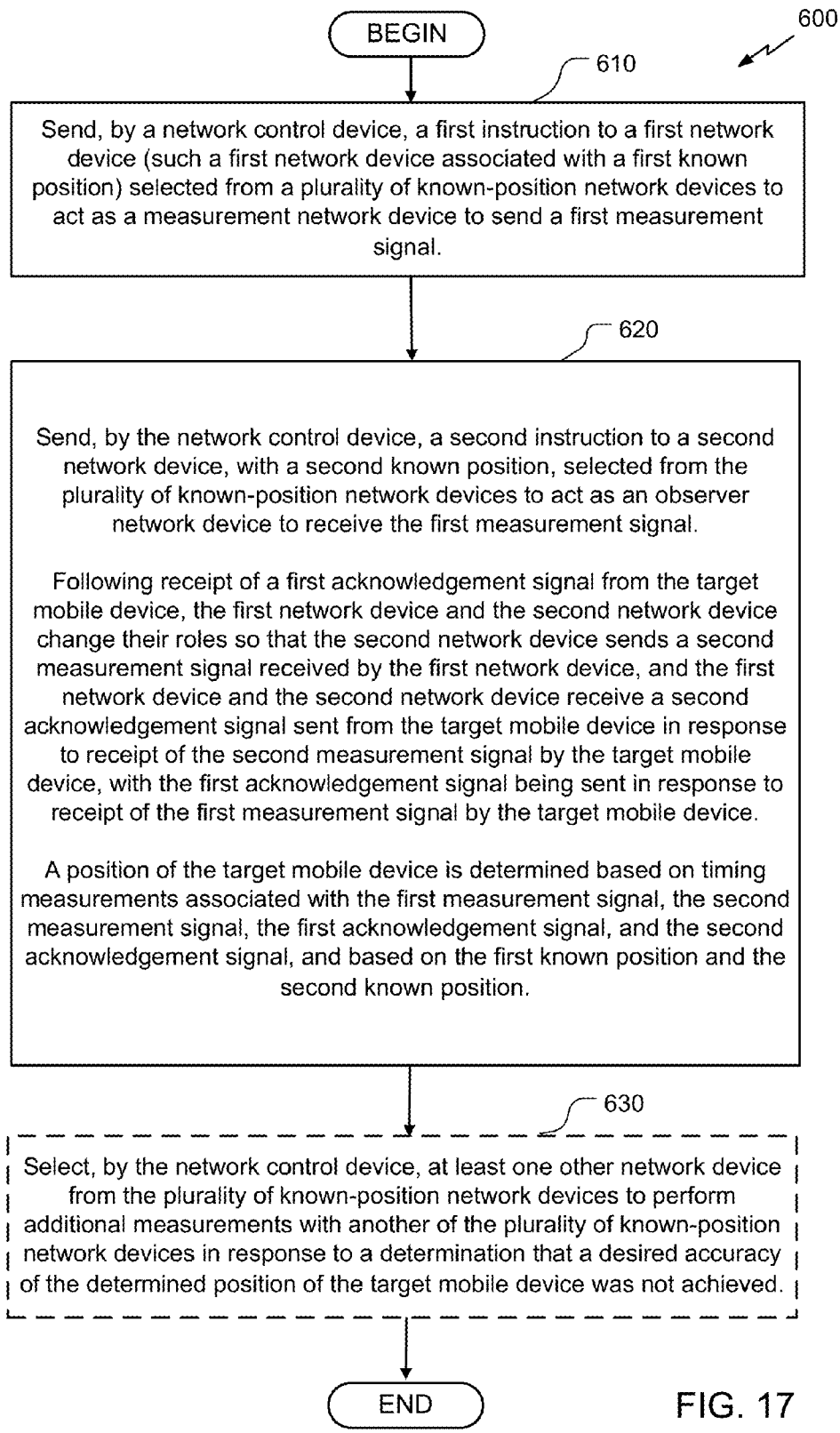
FIG. 17 is a flowchart of an example procedure to facilitate position determination of a target mobile device.

With reference now to FIG. 17, a flowchart of an example procedure 600 to facilitate position determination of a target mobile device (such as the target mobile devices 12 and 312) is shown. The procedure 600 includes sending 610, by a network control device (such as the network control device 320 of FIG. 14, which may include an NBP Lib module such as the module 322 of FIG. 14), a first instruction to a first network device (e.g., any one of the devices 314, $314_1$, $314_2$, or 316), with such a first network device being associated with a known position. The first device is selected (e.g., by the NBP Lib module of the network control device) from a plurality of known-position network devices to act as a measurement network device to send a first measurement signal. As noted, in some embodiments, the network control device may be implemented at the target mobile device (in which case the target mobile device initiates and controls the measurement and observation operations to determine a position estimate for itself), or at some other remote device such as the remote server 319 of FIG. 14.

A second instruction is sent 620, by the network control device, to a second network device, also with a known position, that is selected from the plurality of known-position network devices to act as an observer network device to receive the first measurement signal.

In some embodiments, following receipt of a first acknowledgement signal from the target mobile device (sent in response to receipt of the first measurement signal at the target mobile device), the first network device and the second network device change their roles so that the second network device sends a second measurement signal received by the first network device, and the first network device and the second network device receive a second acknowledgement signal sent from the target mobile device in response to receipt of the second measurement signal by the target mobile device. The position of the target mobile device may then be determined based on timing measurements associated with the first measurement signal, the second measurement signal, the first acknowledgement signal, and the second acknowledgement signal, and based on the first known position and the second known position. In some embodiments, determination of the position of the target mobile device may be performed at the network control device (e.g., on a positioning engine) or at a device/system at which the network control device is implemented. Where the network control device is implemented at the target mobile device, the target mobile device may thus also include a positioning engine to derive a position estimate for its position based on the timing measurements provided by the various network devices it is controlling.

As further illustrated in FIG. 17, optionally, in some embodiments, the procedure 600 may also include selecting 630, by the network control device, at least one other network device from the plurality of known-position network devices to perform additional measurements with another of the plurality of known-position network devices in response to a determination that a desired accuracy of the determined position of the target mobile device (e.g., determined based, for example, on HEPE computations) was not achieved.

Further Considerations

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A method to determine a position of a target mobile device, at a processor-based network control device, the method comprising:

sending, by the network control device, a first instruction to a first network device, selected from a plurality of known-position network devices, to act as a measurement network device to send a first measurement signal;

sending, by the network control device, a second instruction to a second network device, selected from the plurality of known-position network devices, to act as an observer network device to receive the first measurement signal, the first network device associated with a first known position and the second network device associated with a second known position, wherein, following receipt of a first acknowledgement signal from the target mobile device, the first network device and the second network device change their roles so that the second network device sends a second measurement signal received by the first network device, and the first network device and the second network device receive a second acknowledgement signal sent from the target mobile device in response to receipt of the second measurement signal by the target mobile device, the first acknowledgement signal being sent in response to receipt of the first measurement signal by the target mobile device, and wherein the position of the target mobile device is determined based on timing measurements associated with the first measurement signal, the second measurement signal, the first acknowledgement signal, and the second acknowledgement signal, and based on the first known position and the second known position; and selecting, by the network control device, at least one other network device from the plurality of known-position network devices to perform additional measurements with another of the plurality of known-position network devices in response to a determination that a desired accuracy of the determined position of the target mobile device was not achieved.

2. The method of claim 1, further comprising:
sending, by the network control device, a third instruction to cause the first network device and the second network device to change their roles.

3. The method of claim 1, wherein the first network device and the second network device change their roles in response to a measurement-complete indication or an exchange message communicated by the first network device following receipt of the first acknowledgement signal, by the first network device, from the target mobile device and completion of a measurement of the first acknowledgement signal by the first network device.

4. The method of claim 1, wherein the network control device includes a network-based positioning (NBP) library module configured to select the first network device, the second network device, and the at least one other network device from the plurality of known-position network devices, and to cause the first instruction and the second instruction to be sent.

5. The method of claim 4, wherein the network control device is implemented at the target mobile device.

6. The method of claim 4, wherein the network control device is implemented at a remote server, different from the target mobile device, in communication with the plurality of known-position network devices.

7. The method of claim 6, wherein the remote server comprises a network interface to communicate with the plurality of known-position network devices, and a position engine to determine the position of the target mobile device.

8. The method of claim 1, further comprising:
receiving from the target mobile device a request message to cause the sending of at least the first instruction and the second instruction from the network control device.

9. The method of claim 1, further comprising:
determining, at the network control device, the position of the target mobile device based on the timing measurements associated with the first measurement signal, the second measurement signal, the first acknowledgement signal, the second acknowledgement signal, and based on the first known position and the second known position.

10. The method of claim 1, wherein the timing measurements comprise a transmission time of the first measurement signal, a first time of arrival of the first acknowledgement signal at the first network device, a second time of arrival of the first measurement signal at the second network device, and a third time of arrival of the first acknowledgement signal at the second network device, and wherein the position of the target mobile device is determined based on a first distance and a second distance from the target mobile device to the first network device and the second network device, respectively, determined based, at least in part, on the transmission time of the first measurement signal, the first time of arrival, the second time of arrival, and the third time of arrival.

11. The method of claim 10, wherein the timing measurements further comprises a second transmission time of the second measurement signal, a fourth time of arrival of the second acknowledgement signal at the second network device, a fifth time of arrival of the second measurement signal at the first network device, and a sixth time of arrival of the second acknowledgement signal at the first network device, wherein the position of the target mobile device is determined based on the first distance and the second distance from the target mobile device to the first network device and the second network device, respectively, the first and second distances further determined based on the second transmission time, the fourth time of arrival, the fifth time of arrival, and the sixth time of arrival.

12. The method of claim 10, wherein the first distance and the second distance determined based on the transmission time of the first measurement signal, the first time of arrival, the second time of arrival, and the third time of arrival are determined based on a difference between (1) a first difference between the first time of arrival and the transmission time of the first measurement signal and (2) a second difference between the third time of arrival and the second time of arrival.

13. The method of claim 10, further comprising:
sending, by the network control device, a fourth instruction to a third network device to receive the first measurement signal at the third network device; and
sending, by the network control device, a fifth instruction to the third network device to receive the first acknowledgement signal from the target mobile device at the third network device;
wherein the timing measurements comprises a transmission time of the first measurement signal, the first time of arrival of the first acknowledgement signal at the first network device, a seventh time of arrival of the first measurement signal at the third network device, and an eighth time of arrival of the first acknowledgement signal at the third network device; and
wherein the position of the target mobile device is determined based further on a third distance from the target mobile device to the third network device determined using the seventh time of arrival and the eighth time of arrival.

14. The method of claim 1, further comprising:
sending, by the network control device, a sixth instruction to the first network device to send an exchange message from the first network device indicating receipt of the first acknowledgement signal, wherein the second measurement signal is sent from the second network device in response to the exchange message being received by the second network device.

15. The method of claim 1, wherein the position of the target mobile device is determined based further on further timing measurements from the at least one other of the plurality of known-position network devices and the other of the plurality of known-position network devices.

16. A network control device comprising:
a communication module;
memory; and
one or more processors coupled to the memory and to the communication module;
the network control device configured to:
send a first instruction to a first network device, selected from a plurality of known-position network devices, to act as a measurement network device to send a first measurement signal;
send a second instruction to a second network device, selected from the plurality of known-position network devices, to act as an observer network device to receive the first measurement signal, the first network device associated with a first known position and the second network device associated with a second known position, wherein, following receipt of a first acknowledgement signal from a target mobile device, the first network device and the second network device change their roles so that the second network device sends a second measurement signal received by the first network device, and the first network device and the second network device receive a second acknowledgement signal sent from the target mobile device in response to receipt of the second measurement signal by the target mobile device, the first acknowledgement signal being sent in response to receipt of the first measurement signal by the target mobile device, and wherein the position of the target mobile device is determined based on timing measurements associated with the first measurement signal, the second measurement signal, the first acknowledgement signal, and the second acknowledgement signal, and based on the first known position and the second known position; and select at least one other network device from the plurality of known-position network devices to perform additional measurements with another of the plurality of known-position network devices in response to a determination that a desired accuracy of the determined position of the target mobile device was not achieved.

17. The network control device of claim 16, wherein the network control device is further configured to:
send a third instruction to cause the first network device and the second network device to change their roles.

18. The network control device of claim 16, wherein the first network device and the second network device change their roles in response to a measurement-complete indication or an exchange message communicated by the first network device following receipt of the first acknowledgement signal, by the first network device, from the target mobile device and completion of a measurement of the first acknowledgement signal by the first network device.

19. The network control device of claim 16, further comprising:
a network-based positioning (NBP) library module configured to select the first network device, the second network device, and the at least one other network device from the plurality of known-position network devices, and to cause the first instruction and the second instruction to be sent.

20. The network control device of claim 16, wherein the network control device is implemented at one of: the target mobile device, or a remote server, different from the target mobile device, in communication with the plurality of known-position network devices.

21. The network control device of claim 16, further comprising:
a position engine (PE) configured to determine a position of the target mobile device based, at least in part, on the timing measurements associated with the first measurement signal, the second measurement signal, the first acknowledgement signal, the second acknowledgement signal, and based on the first known position and the second known position.

22. The network control device of claim 16, wherein the timing measurements comprise a transmission time of the first measurement signal, a first time of arrival of the first acknowledgement signal at the first network device, a second time of arrival of the first measurement signal at the second network device, and a third time of arrival of the first acknowledgement signal at the second network device, and wherein a position of the target mobile device is determined based on a first distance and a second distance from the target mobile device to the first network device and the second network device, respectively, determined based, at least in part, on the transmission time of the first measurement signal, the first time of arrival, the second time of arrival, and the third time of arrival.

23. A non-transitory computer readable storage media programmed with a set of instructions, executable on a processor, to:
send, by a network control device, a first instruction to a first network device, selected from a plurality of known-position network devices, to act as a measurement network device to send a first measurement signal;
send, by the network control device, a second instruction to a second network device, selected from the plurality of known-position network devices, to act as an observer network device to receive the first measurement signal, the first network device associated with a first known position and the second network device associated with a second known position, wherein, following receipt of a first acknowledgement signal from a target mobile device, the first network device and the second network device change their roles so that the second network device sends a second measurement signal received by the first network device, and the first network device and the second network device receive a second acknowledgement signal sent from the target mobile device in response to receipt of the second measurement signal by the target mobile device, the first acknowledgement signal being sent in response to receipt of the first measurement signal by the target mobile device, and wherein the position of the target mobile device is determined based on timing measurements associated with the first measurement signal, the second measurement signal, the first acknowledgement signal, and the second acknowledgement signal, and based on the first known position and the second known position; and
select, by the network control device, at least one other network device from the plurality of known-position network devices to perform additional measurements with another of the plurality of known-position network devices in response to a determination that a desired accuracy of the determined position of the target mobile device was not achieved.

24. The computer readable storage media of claim 23, wherein the set of instructions further comprises instructions to:
send a third instruction to cause the first network device and the second network device to change their roles.

25. The computer readable storage media of claim 23, wherein the first network device and the second network device change their roles in response to a measurement-complete indication or an exchange message communicated by the first network device following receipt of the first acknowledgement signal, by the first network device, from the target mobile device and completion of a measurement of the first acknowledgement signal by the first network device.

26. The computer readable storage media of claim 23, wherein the network control device includes a network-based positioning (NBP) library module configured to select the first network device, the second network device, and the at least one other network device from the plurality of known-position network devices, and to cause the first instruction and the second instruction to be sent.

27. The computer readable storage media of claim 23, wherein the network control device is implemented at one of: the target mobile device, or a remote server, different from the target mobile device, in communication with the plurality of known-position network devices.

28. The computer readable storage media of claim 23, wherein the set of instructions further comprises instructions to:
- determine, at the network control device, a position of the target mobile device based on the timing measurements associated with the first measurement signal, the second measurement signal, the first acknowledgement signal, the second acknowledgement signal, and based on the first known position and the second known position.

29. A method to determine a position of a target mobile device, the method comprising:
- sending, by the target mobile device, a first instruction to a first network device selected from a plurality of known-position network devices to act as a measurement network device to send a first measurement signal; and
- sending, by the target mobile device, a second instruction to a second network device selected from the plurality of known-position network devices to act as an observer network device to receive the first measurement signal, the first network device associated with a first known position and the second network device associated with a second known position;
- wherein the position of the target mobile device is determined based at least on transmission time of the first measurement signal sent by the first network device in response to the first instruction sent by the target device, a first time-of-arrival measurement of the first measurement signal at the second network device, and second time-of-arrival measurements at the first network device and the second network device of a first acknowledgement signal sent by the target mobile device in response to receiving the first measurement signal, and wherein the position of the target mobile device is determined further based on the first known position and the second known position.

30. The method of claim 29, wherein the target mobile device includes a network-based positioning library module configured to select the first network device and the second network device, and to cause the first instruction and the second instruction to be sent.

* * * * *